United States Patent
Yu et al.

(10) Patent No.: US 12,328,061 B2
(45) Date of Patent: Jun. 10, 2025

(54) METHOD AND APPARATUS FOR SUPPRESSING CROSS CURRENT IN INVERTER PARALLEL SYSTEM

(71) Applicant: Huawei Digital Power Technologies Co., Ltd., Shenzhen (CN)

(72) Inventors: Xinyu Yu, Shanghai (CN); Kai Xin, Shanghai (CN); Zhiwu Xu, Shenzhen (CN); Yanzhong Zhang, Shanghai (CN); Junjie Li, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 198 days.

(21) Appl. No.: 18/329,896

(22) Filed: Jun. 6, 2023

(65) Prior Publication Data
US 2023/0318440 A1    Oct. 5, 2023

Related U.S. Application Data

(63) Continuation of application No. PCT/CN2020/142011, filed on Dec. 31, 2020.

(51) Int. Cl.
*H02M 1/12* (2006.01)
*H02M 7/493* (2007.01)

(52) U.S. Cl.
CPC ........... *H02M 1/123* (2021.05); *H02M 7/493* (2013.01)

(58) Field of Classification Search
CPC .............................. H02M 1/123; H02M 7/493
See application file for complete search history.

(56) References Cited

U.S. PATENT DOCUMENTS

| 7,564,703 | B1 | 7/2009 | Braun et al. |
| 11,837,868 | B2 * | 12/2023 | Meng ...................... H02S 50/00 |

(Continued)

FOREIGN PATENT DOCUMENTS

| CN | 102545677 A | 7/2012 |
| CN | 104201920 A | 12/2014 |

(Continued)

OTHER PUBLICATIONS

Robert M. Cuzner "Mitigating Circulating Common-Mode Currents Between Parallel Soft-Switched Drive Systems" 2007 (Year: 2007).*

*Primary Examiner* — Sisay G Tiku
(74) *Attorney, Agent, or Firm* — Maier & Maier, PLLC

(57) ABSTRACT

A method and apparatus for suppressing cross current including: obtaining a common-mode current and a common-mode injection voltage of each inverter in an inverter parallel system; determining a virtual damping voltage of each inverter based on the common-mode current of each inverter and a preset common-mode damping factor, where if a direction in which a current flows out of the inverter is a positive direction, the preset common-mode damping factor is a negative value, or if a direction in which a current flows into the inverter is a positive direction, the preset common-mode damping factor is a positive value; superimposing the virtual damping voltage on the common-mode injection voltage of each inverter, to obtain a target common-mode voltage of each inverter; and controlling operation of each inverter based on the target common-mode voltage of each inverter and a differential mode voltage of each inverter.

20 Claims, 15 Drawing Sheets

(56) References Cited

U.S. PATENT DOCUMENTS

| | | | | |
|---|---|---|---|---|
| 2023/0308009 A1* | 9/2023 | Yu | .......................... | H02M 1/32 |
| 2023/0318440 A1* | 10/2023 | Yu | ........................ | H02M 1/123 |
| | | | | 363/39 |
| 2023/0327453 A1* | 10/2023 | Yu | ........................ | H02M 1/123 |
| | | | | 307/82 |
| 2024/0022181 A1* | 1/2024 | Yu | .......................... | H20M 1/14 |
| 2024/0106244 A1* | 3/2024 | Yu | ...................... | H02M 1/0074 |
| 2024/0106351 A1* | 3/2024 | Yu | ........................ | H02M 7/537 |

FOREIGN PATENT DOCUMENTS

| | | | | |
|---|---|---|---|---|
| CN | 104538987 A | 4/2015 | | |
| CN | 104638963 A | 5/2015 | | |
| CN | 109302094 A | 2/2019 | | |
| CN | 109755941 A | 5/2019 | | |
| CN | 111342646 A | 6/2020 | | |
| CN | 211791315 U | 10/2020 | | |
| EP | 4064502 A1 * | 9/2022 | .............. | H02J 3/381 |

* cited by examiner

METHOD AND APPARATUS FOR SUPPRESSING CROSS CURRENT IN INVERTER PARALLEL SYSTEM

CROSS-REFERENCE TO RELATED APPLICATIONS

This application is a continuation of International Application No. PCT/CN2020/142011, filed on Dec. 31, 2020, the disclosure of which is hereby incorporated by reference in its entirety.

TECHNICAL FIELD

The embodiments relate to the field of power supply, and a method and an apparatus for suppressing a cross current in an inverter parallel system.

BACKGROUND

An inverter is an apparatus that converts a direct current into an alternating current. To increase a power capacity of the inverter, a plurality of inverters may be connected in series or in parallel. However, after the plurality of inverters are connected in series or in parallel, a cross current loop may be formed. A cross current formed on the cross current loop affects inversion efficiency and easily induces overcurrent protection.

FIG. 1 shows an inverter parallel system. As shown in FIG. 1, the inverter parallel system includes four inverters, namely, an inverter 1 to an inverter 4. Direct current input terminals of the inverter 1 to the inverter 4 are respectively connected to four direct current (DC) power supplies (for example, the direct current input terminals of the inverter 1 to the inverter 4 in FIG. 1 are respectively connected to a DC 1 to a DC 4). Alternating current output terminals of the inverter 1 and the inverter 3 are connected in parallel and alternating current output terminals of the inverter 2 and the inverter 4 are connected in parallel. If there is a difference between a sum of a direct current bus voltage of the inverter 1 and a direct current bus voltage of the inverter 2 and a sum of a direct current bus voltage of the inverter 3 and a direct current bus voltage of the inverter 4, a cross current is formed between the four inverters, and this affects normal operation of the inverter parallel system.

To suppress the cross current in the inverter parallel system, in one solution, positive buses and negative buses of the inverters each are connected in parallel through hardware wiring, so that the plurality of inverters may have a same bus voltage. However, in this solution, an additional direct current parallel operation cable is needed, and therefore, initial investment is large and economic efficiency is low. In another solution, direct current bus voltages of different inverters are detected, to adjust the direct current bus voltages. However, this solution belongs to open loop control, and when it is detected that there is a small difference between the direct current bus voltages of the different inverters, a large cross current still occurs.

SUMMARY

The embodiments may provide a method and an apparatus for suppressing a cross current in an inverter parallel system, to suppress a cross current in an inverter parallel system and improve reliability of inverter components.

To achieve the foregoing objectives, the following solutions are used in the embodiments:

According to a first aspect of the embodiments, a method for suppressing a cross current in an inverter parallel system is provided. The method includes: obtaining a common-mode current and a common-mode injection voltage of each inverter in an inverter parallel system; determining a virtual damping voltage of each inverter based on the common-mode current and a preset common-mode damping factor of each inverter, where if a direction in which a current flows out of the inverter is a positive direction, the preset common-mode damping factor is a negative value, or if a direction in which a current flows into the inverter is a positive direction, the preset common-mode damping factor is a positive value; superimposing the virtual damping voltage on the common-mode injection voltage of each inverter, to obtain a target common-mode voltage of each inverter; and controlling operation of each inverter based on the target common-mode voltage of each inverter and a differential mode voltage of each inverter. According to the present solution, when a cross current is generated in the inverter parallel system, directions of common-mode currents of different inverters are different; and if a direction in which a current flows out of an inverter is specified as a positive direction in advance, the preset common-mode damping factor is set to a negative value, or if a direction in which a current flows into the inverter is specified as a positive direction in advance, the preset common-mode damping factor is set to a positive value. Therefore, the virtual damping voltage can be superimposed on the common-mode injection voltage of each inverter, so that an effective value of common-mode voltage difference between the inverters is reduced. Therefore, a common-mode cross current can be reduced, and the cross current in the inverter parallel system is effectively suppressed. In addition, compared with the conventional technology in which a cross current is suppressed through hardware wiring, in the solution, a cross current of an inverter is detected in real time and a virtual damping voltage is superimposed, so that the cross current may be suppressed without a hardware parallel cable. Therefore, cable costs may be reduced and economic efficiency is high.

With reference to the first aspect, in a possible implementation, the inverter parallel system includes: N inverter groups, where N is an integer greater than or equal to 2, and each inverter group includes a first inverter and a second inverter. A direct current input terminal of the first inverter is connected to a first direct current power supply, a direct current input terminal of the second inverter is connected to a second direct current power supply, and a negative electrode of the first direct current power supply is connected to a positive electrode of the second direct current power supply. Alternating current output terminals of N first inverters in the N inverter groups are connected to a first transformer, and alternating current output terminals of N second inverters in the N inverter groups are connected to a second transformer. Optionally, the inverter parallel system may be referred to as a direct current cascaded alternating current parallel system. According to the present solution, the method for suppressing a cross current may be applied to the direct current cascaded alternating current parallel system, and can reduce the cross current in the direct current cascaded alternating current parallel system, and improve the reliability of the inverter components in the direct current cascaded alternating current parallel system.

With reference to the first aspect and the foregoing possible implementation, in another possible implementation, negative electrodes of N first direct current power supplies in the N inverter groups are connected to each other. According to the present solution, in the inverter parallel system, the negative electrodes of the N first direct current power supplies in the direct current cascaded alternating current parallel system are connected to each other, so that according to the method for suppressing a cross current, the cross current in the inverter parallel system can be reduced, and reliability of the inverter components in the inverter parallel system can be improved.

With reference to the first aspect and the foregoing possible implementations, in another possible implementation, the inverter parallel system includes: N inverters, where N is an integer greater than or equal to 2. Alternating current output terminals of the N inverters are connected to each other, and the alternating current output terminals of the N inverters are connected to a transformer. Direct current input terminals of the N inverters are respectively connected to N direct current power supplies, and positive electrodes of the N direct current power supplies are connected to each other. Optionally, the inverter parallel system may be referred to as a common direct current positive electrode alternating current parallel system. According to the present solution, the method for suppressing a cross current may be applied to the common direct current positive electrode alternating current parallel system and can reduce the cross current in the common direct current positive electrode alternating current parallel system and improve reliability of inverter components in the common direct current positive electrode alternating current parallel system.

With reference to the first aspect and the foregoing possible implementations, in another possible implementation, the inverter parallel system includes: N inverters, where N is an integer greater than or equal to 2. Alternating current output terminals of the N inverters are connected to each other, and the alternating current output terminals of the N inverters are connected to a transformer. Direct current input terminals of the N inverters are respectively connected to N direct current power supplies, and negative electrodes of the N direct current power supplies are connected to each other. Optionally, the inverter parallel system may be referred to as a common direct current negative electrode alternating current parallel system. According to the present solution, the method for suppressing a cross current may be applied to the common direct current negative electrode alternating current parallel system and can reduce the cross current in the common direct current negative electrode alternating current parallel system and improve the reliability of the inverter components in the common direct current negative electrode alternating current parallel system.

With reference to the first aspect and the foregoing possible implementations, in another possible implementation, the obtaining a common-mode injection voltage of each inverter includes: determining the common-mode injection voltage of each inverter based on a common-mode voltage injection mode of each inverter. According to the present solution, the common-mode injection voltage of each inverter may be calculated based on the common-mode voltage injection mode of each inverter, so that after the virtual damping voltage is superimposed on the common-mode injection voltage, the effective value of the common-mode voltage difference between the inverters may be reduced. Therefore, the common-mode cross current can be reduced, and the cross current in the inverter parallel system is effectively suppressed. Optionally, the common-mode voltage injection mode includes sine pulse width modulation (SPWM), space vector pulse width modulation (SVPWM), or discontinuity pulse width modulation (DPWM). Optionally, all inverters in the inverter parallel system may have a same common-mode voltage injection mode.

Optionally, if a direction in which a current flows out of an inverter is a positive direction, the preset common-mode damping factor may be −1.5 ohms; or if a direction in which a current flows into the inverter is a positive direction, the preset common-mode damping factor may be 1.5 ohms.

With reference to the first aspect and the foregoing possible implementations, in another possible implementation, the target common-mode voltage is obtained through the following formulas: $U_{cmv}=U_{cmv0}+U_{vir}$ and $U_{vir}=i_{cmv}R_{vir}$, where $U_{cmv}$ is the target common-mode voltage, $U_{cmv0}$ is the common-mode injection voltage, $U_{vir}$ is the virtual damping voltage, $R_{vir}$ is the preset common-mode damping factor, and $i_{cmv}$ is the common-mode current. According to the present solution, the effective value of the common-mode voltage difference between the inverters may be reduced by superimposing the virtual damping voltage on the common-mode injection voltage of each inverter. Therefore, the common-mode cross current can be reduced, and the cross current in the inverter parallel system is effectively suppressed.

With reference to the first aspect and the foregoing possible implementations, in another possible implementation, the common-mode current may be obtained through the following formula: $i_{cmv}=(i_a+i_b+i_c)/3$, where $i_a$, $i_b$, and $i_c$ each are a three-phase output current of the inverter, and $i_{cmv}$ is the common-mode current. According to the present solution, the common-mode current of the inverter may be calculated by using the three-phase output currents of the inverter, so that the virtual damping voltage superimposed on the common-mode injection voltage of each inverter is determined with reference to the common-mode current of the inverter, and after the virtual damping voltage is superimposed on the common-mode injection voltage, the effective value of the common-mode voltage difference between the inverters may be reduced. Therefore, the common-mode cross current can be reduced, and the cross current in the inverter parallel system is effectively suppressed.

With reference to the first aspect and the foregoing possible implementations, in another possible implementation, the controlling operation of each inverter based on the target common-mode voltage of each inverter and a differential mode voltage of each inverter includes: superimposing the target common-mode voltage of each inverter on the differential mode voltage of each inverter, to obtain a modulation voltage of each inverter; and controlling the operation of each inverter by using the modulation voltage of each inverter as a drive signal of a switching element of each inverter. According to the present solution, the target common-mode voltage is obtained by superimposing the virtual damping voltage on the common-mode injection voltage of each inverter, and when the operation of the inverter is controlled based on the target common-mode voltage and the differential mode voltage, the effective value of the common-mode voltage difference between the inverters may be reduced. Therefore, the common-mode cross current can be reduced, and the cross current in the inverter parallel system is effectively suppressed.

According to a second aspect of the embodiments, an apparatus for suppressing a cross current in an inverter parallel system is provided. The apparatus includes: a processor, configured to obtain a common-mode current and a common-mode injection voltage of each inverter in an inverter parallel system. The processor is further configured to determine a virtual damping voltage of each inverter based on the common-mode current and a preset common-mode damping factor of each inverter, where if a direction in which a current flows out of the inverter is a positive direction, the preset common-mode damping factor is a negative value, or if a direction in which a current flows into the inverter is a positive direction, the preset common-mode damping factor is a positive value. The processor is further configured to superimpose the virtual damping voltage on the common-mode injection voltage of each inverter, to obtain a target common-mode voltage of each inverter. The processor is further configured to control operation of each inverter by a controller based on the target common-mode voltage of each inverter, obtained by the processor, and a differential mode voltage of each inverter.

With reference to the second aspect, in a possible implementation, the inverter parallel system includes: N inverter groups, where N is an integer greater than or equal to 2, and each inverter group includes a first inverter and a second inverter. A direct current input terminal of the first inverter is connected to a first direct current power supply, a direct current input terminal of the second inverter is connected to a second direct current power supply, and a negative electrode of the first direct current power supply is connected to a positive electrode of the second direct current power supply. Alternating current output terminals of N first inverters in the N inverter groups are connected to a first transformer, and alternating current output terminals of N second inverters in the N inverter groups are connected to a second transformer.

With reference to the second aspect and the foregoing possible implementation, in another possible implementation, negative electrodes of N first direct current power supplies in the N inverter groups are connected to each other.

With reference to the second aspect and the foregoing possible implementations, in another possible implementation, the inverter parallel system includes: N inverters, where N is an integer greater than or equal to 2. Alternating current output terminals of the N inverters are connected to each other, and the alternating current output terminals of the N inverters are connected to a transformer. Direct current input terminals of the N inverters are respectively connected to N direct current power supplies, and positive electrodes of the N direct current power supplies are connected to each other. With reference to the second aspect and the foregoing possible implementations, in another possible implementation, the inverter parallel system includes: N inverters, where N is an integer greater than or equal to 2. Alternating current output terminals of the N inverters are connected to each other, and the alternating current output terminals of the N inverters are connected to a transformer. Direct current input terminals of the N inverters are respectively connected to N direct current power supplies, and negative electrodes of the N direct current power supplies are connected to each other.

With reference to the second aspect and the foregoing possible implementations, in another possible implementation, the processor is configured to: determine the common-mode injection voltage of each inverter based on a common-mode voltage injection mode of each inverter.

With reference to the second aspect and the foregoing possible implementations, in another possible implementation, the common-mode voltage injection mode includes sine pulse width modulation (SPWM), space vector pulse width modulation (SVPWM), or discontinuity pulse width modulation (DPWM).

With reference to the second aspect and the foregoing possible implementations, in another possible implementation, the target common-mode voltage is obtained through the following formulas: $U_{cmv}=U_{cmv0}+U_{vir}$ and $U_{vir}=i_{cmv}R_{vir}$, where $U_{cmv}$ is the target common-mode voltage, $U_{cmv0}$ is the common-mode injection voltage, $U_{vir}$ is the virtual damping voltage, $R_{vir}$ is the preset common-mode damping factor, and $i_{cmv}$ is the common-mode current.

With reference to the second aspect and the foregoing possible implementations, in another possible implementation, the common-mode current may be obtained through the following formula: $i_{cmv}=(i_a+i_b+i_c)/3$, where $i_a$, $i_b$, and $i_c$ each are a three-phase output current of the inverter, and $i_{cmv}$ is the common-mode current.

With the reference to the second aspect and the foregoing possible implementations, in another possible implementation, the processor is further configured to superimpose the target common-mode voltage of each inverter on the differential mode voltage of each inverter, to obtain a modulation voltage of each inverter; and the controller is configured to control the operation of each inverter by using the modulation voltage of each inverter, obtained by the processor, as a drive signal of a switching element of each inverter.

According to a third aspect of the embodiments, a power supply system is provided. The power supply system includes an inverter parallel system, and the apparatus for suppressing a cross current in an inverter parallel system according to any possible implementation of the second aspect, where the apparatus for suppressing a cross current in an inverter parallel system is configured to suppress a cross current in the inverter parallel system.

BRIEF DESCRIPTION OF THE DRAWINGS

FIG. 3b-1 and FIG. 3b-2 are a schematic diagram of a structure of another inverter parallel system according to an embodiment;

FIG. 4b-1 and FIG. 4b-2 are a schematic diagram of a structure of another inverter parallel system according to an embodiment;

DETAILED DESCRIPTION OF THE EMBODIMENTS

The following describes the embodiments with reference to the accompanying drawings. "At least one" refers to one or more, and "a plurality of" refers to two or more. "and/or" is used to describe an association relationship between associated objects and represents that three relationships may exist. For example, A and/or B may represent the following three cases: only A exists, both A and B exist, and only B exists, where A and B may be singular or plural. The character "/" may represent an "or" relationship between the associated objects. "At least one of the following items (pieces)" or a similar expression thereof refers to any combination of these items, including any combination of singular items (pieces) or plural items (pieces). For example, at least one item (piece) of a, b, and c may represent a, b, c, a and b, a and c, b and c, or a, b, and c, where a, b, and c may be a singular or plural. In addition, to facilitate clear description of the embodiments, the terms "first", "second", and the like are used to distinguish between same or similar items with the same functions and roles. A person skilled in the art may understand that the terms "first", "second", and the like are not construed as a limitation on quantity and execution order. For example, the "first" in the "first inverter" and the "second" in the "second inverter" in the embodiments are only used to distinguish between different inverters. In the embodiments, the "first", "second", and the like are used only for illustrating and distinguishing between described objects but do not indicate a sequence, do not indicate a particular limitation on quantities of devices in the embodiments, and cannot be construed as any limitation on the embodiments.

It should be noted that terms such as "for example" are used to indicate an example, an illustration, or a description. Any embodiment described as "for example" or the like should not be interpreted as more preferred or advantageous than other embodiments, the terms such as "for example" are intended to present relevant concepts in a manner.

Figure 1:
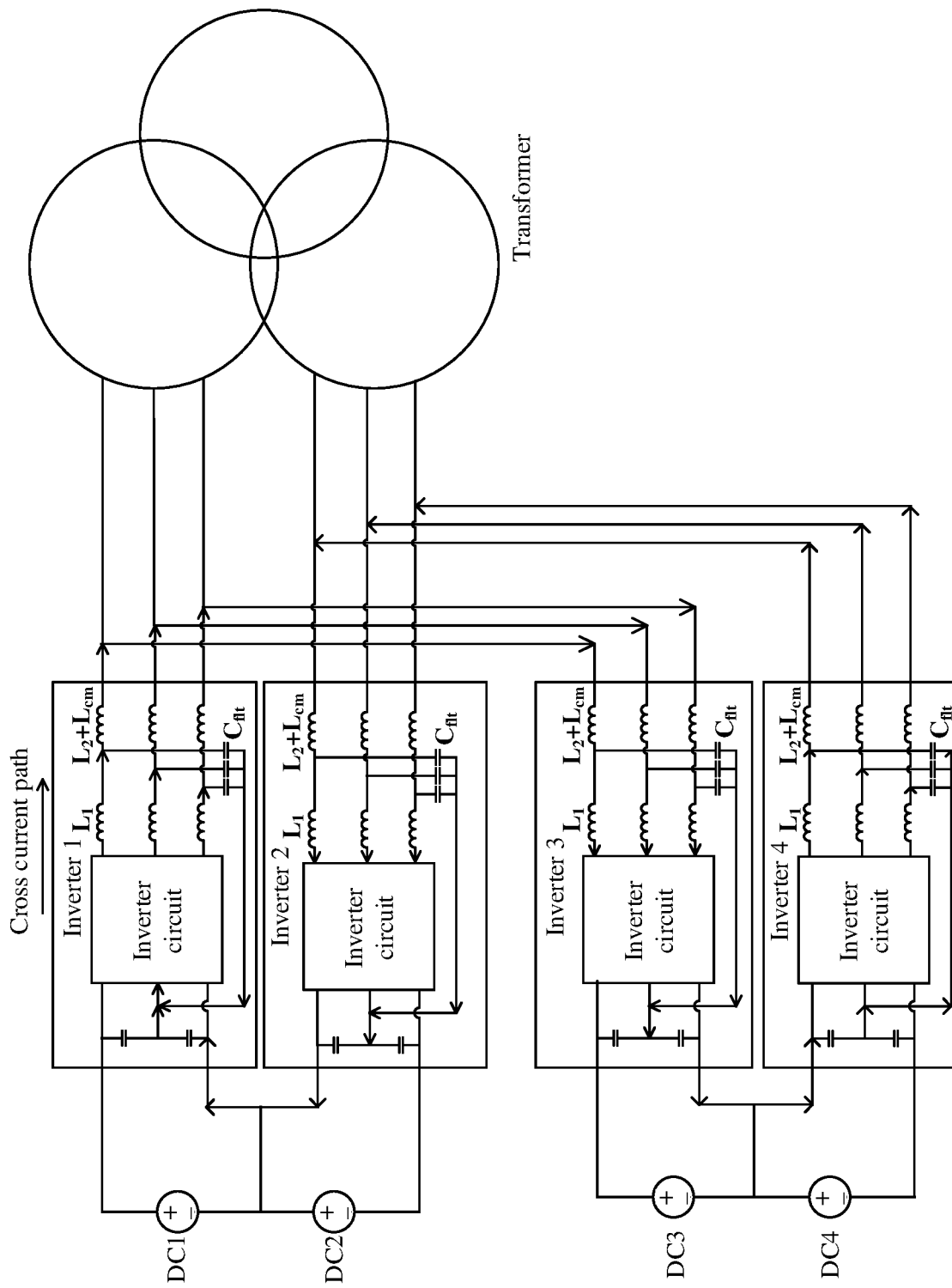
FIG. 1 is a schematic diagram of a structure of generating a cross current in an inverter parallel system according to an embodiment.

For example, FIG. 1 shows an inverter parallel system. The inverter parallel system includes four inverters: an inverter 1, an inverter 2, an inverter 3, and an inverter 4. As shown in FIG. 1, direct current input terminals of the inverter 1, the inverter 2, the inverter 3, and the inverter 4 are respectively connected to a DC 1 to a DC 4, and the inverter 1 to the inverter 4 are configured to convert direct currents that are respectively connected to the inverter 1 to the inverter 4 into alternating currents. A negative electrode of the DC 1 is connected to a positive electrode of the DC 2, and a negative electrode of the DC 3 is connected to a positive electrode of the DC 4. Optionally, the inverter 1 and the inverter 3 may be referred to as positive inverters, and the inverter 2 and the inverter 4 may be referred to as negative inverters.

As shown in FIG. 1, alternating current output terminals of the inverter 1 and the inverter 3 are connected to each other, and the alternating current output terminals of the inverter 1 and the inverter 3 are connected to one winding of a three-winding transformer. Alternating current output terminals of the inverter 2 and the inverter 4 are connected to each other, and the alternating current output terminals of the inverter 2 and the inverter 4 are connected to another winding of the three-winding transformer.

Optionally, the alternating current output terminals of the inverter 1 and the inverter 3 and the alternating current output terminals of the inverter 2 and the inverter 4 are respectively connected to two different windings. The two different windings may be two different windings of a same transformer or may be windings of different transformers. For example, the alternating current output terminals of the inverter 1 and the inverter 3 may be connected to a two-winding transformer, and the alternating current output terminals of the inverter 2 and the inverter 4 may be connected to another two-winding transformer. In FIG. 1, that the alternating current output terminals of the inverter 1 and the inverter 3 and the alternating current output terminals of the inverter 2 and the inverter 4 are connected to different windings of a same transformer is only used as an example for illustration.

If there is a difference between a sum of a direct current bus voltage of the inverter 1 and a direct current bus voltage of the inverter 2 and a sum of a direct current bus voltage of the inverter 3 and a direct current bus voltage of the inverter 4, a cross current is formed between the inverter 1, the inverter 2, the inverter 3, and the inverter 4. As shown in FIG. 1, the cross current flows from the alternating current output terminal of the inverter 1 to the alternating current output terminal of the inverter 3, then flows through the inverter 3, flows from the direct current input terminal of the inverter 3 to the direct current input terminal of the inverter 4, then flows through the inverter 4, flows from the alternating current output terminal of the inverter 4 to the alternating current output terminal of the inverter 2, then flows through the inverter 2, flows from the direct current input terminal of the inverter 2 to the direct current input terminal of the inverter 1, to form the cross current. It may be understood that in this embodiment, a direction of the cross current in the inverter parallel system is not limited. The direction of the cross current in the inverter parallel system shown in FIG. 1 may alternatively be a direction other than the direction of the cross current shown in FIG. 1. FIG. 1 only shows an example.

The cross current formed in the inverter parallel system affects inversion efficiency of the inverters, and easily induces overcurrent protection, resulting in low reliability of inverter components.

Figure 2:
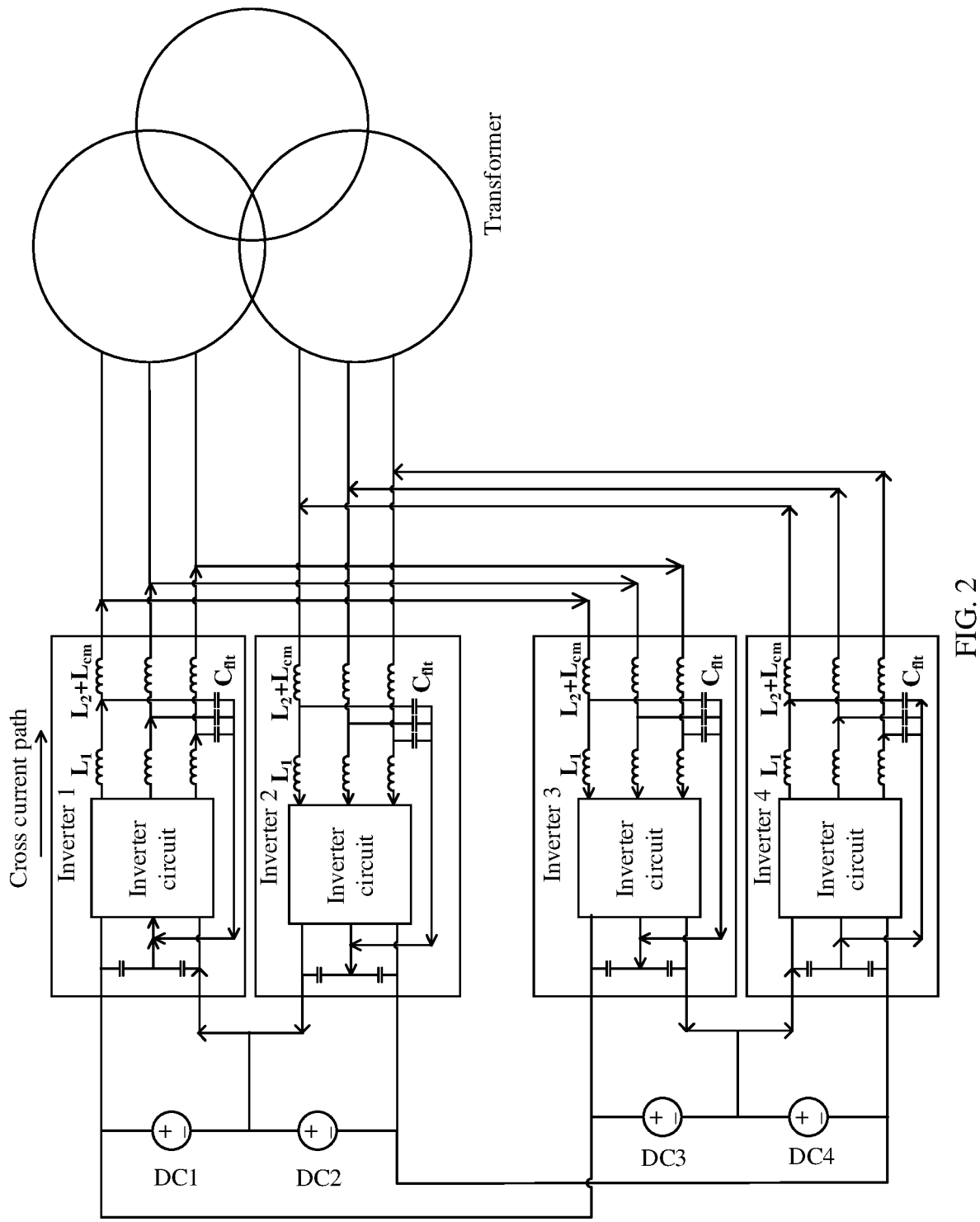
FIG. 2 is a schematic diagram of a structure of suppressing a cross current in an inverter parallel system according to an embodiment.

To suppress a cross current in an inverter parallel system, FIG. 2 provides a solution for suppressing a cross current in an inverter parallel system. As shown in FIG. 2, in this solution, a positive electrode of a DC 1 is connected to a positive electrode of a DC 3, and a negative electrode of a DC 2 is connected to a negative electrode of a DC 4. In this way, a sum of a direct current bus voltage of an inverter 1 and a direct current bus voltage of an inverter 2 is consistent with a sum of a direct current bus voltage of an inverter 3 and a direct current bus voltage of an inverter 4, and the cross current in the parallel inverter system can be suppressed. However, in this solution, a positive electrode of a common direct current bus is connected through hard wiring, and an additional direct current parallel cable is needed. Therefore, initial investment is large and economic efficiency is low.

In another solution for suppressing the cross current in the inverter parallel system, direct current bus voltages of different inverters are detected, and the direct current bus voltages of the inverters are adjusted based on the detected direct current bus voltages, so that the direct current bus voltages of the inverters are consistent. However, this solution belongs to open loop control, and when there is a small difference in detected results of the direct current bus voltages of the different inverters, a large cross current still occurs.

To suppress a cross current in an inverter parallel system on the premise of improving economic efficiency, an embodiment may provide a method for suppressing a cross current. In this method, the cross current in the inverter parallel system may be suppressed without hardware wiring, which improves reliability of inverter components and promotes the economic efficiency.

The method for suppressing a cross current, provided in this embodiment, is applied to an inverter parallel system. The inverter parallel system includes: N inverter groups, where N is an integer greater than or equal to 2, and each inverter group includes a first inverter and a second inverter. A direct current input terminal of the first inverter is connected to a first direct current power supply, a direct current input terminal of the second inverter is connected to a second direct current power supply, and a negative electrode of the first direct current power supply is connected to a positive electrode of the second direct current power supply. Alternating current output terminals of N first inverters in the N inverter groups are connected to each other, and the alternating current output terminals of the N first inverters are connected to a first transformer. Alternating current output terminals of N second inverters in the N inverter groups are connected to each other, and the alternating current output terminals of the N second inverters are connected to a second transformer.

Optionally, the first transformer and the second transformer may be different transformers or a same transformer. When the first transformer and the second transformer are a same transformer, the alternating current output terminals of the N first inverters and the alternating current output terminals of the N second inverters are respectively connected to different windings of the transformer. For example, the alternating current output terminals of the N first inverters are connected to one winding of a three-winding transformer, and the alternating current output terminals of the N second inverters are connected to another winding of the three-winding transformer.

The alternating current output terminals of the N first inverters and the alternating current output terminals of the N second inverters may be respectively connected to two different windings, the two different windings may be different windings of a same transformer or may be windings of different transformers. The following embodiment is only described by taking the two different windings that are different windings of a same transformer as an example.

Figure 3A:
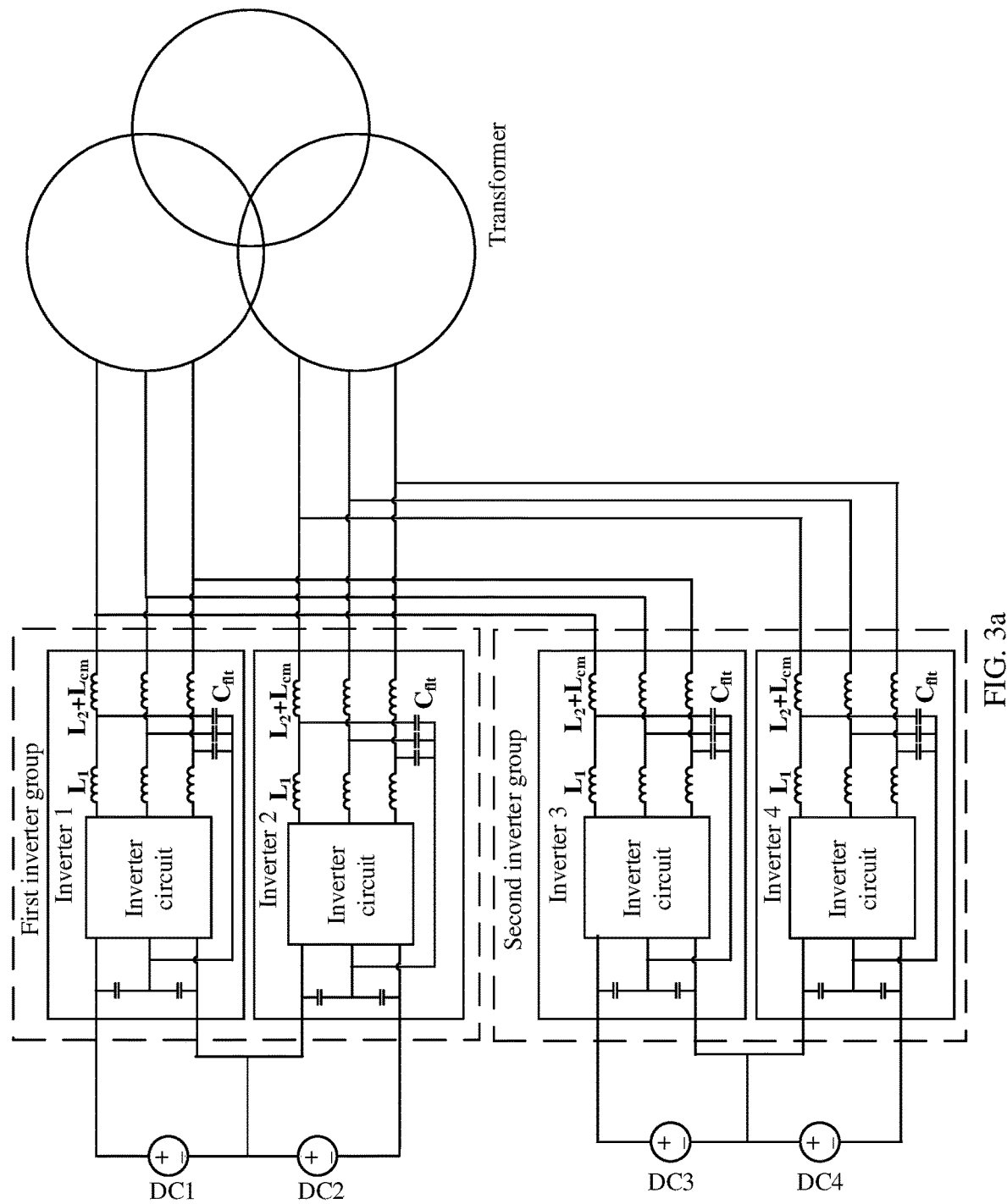
FIG. 3a is a schematic diagram of a structure of an inverter parallel system according to an embodiment.

For example, the inverter parallel system includes two inverter groups. As shown in FIG. 3a, the inverter parallel system includes a first inverter group and a second inverter group. The first inverter group includes an inverter 1 and an inverter 2, and the second inverter group includes an inverter 3 and an inverter 4. A direct current input terminal of the inverter 1 is connected to a DC 1, and a direct current input terminal of the inverter 2 is connected to a DC 2. A negative electrode of the DC 1 is connected to a positive electrode of the DC 2. A direct current input terminal of the inverter 3 is connected to a DC 3, and a direct current input terminal of the inverter 4 is connected to a DC 4. A negative electrode of the DC 3 is connected to a positive electrode of the DC 4. An alternating current output terminal of the inverter 1 is connected to an alternating current output terminal of the inverter 3, and the alternating current output terminals of the inverter 1 and the inverter 3 are connected to one winding of a three-winding transformer. An alternating current output terminal of the inverter 2 is connected to an alternating current output terminal of the inverter 4, and the alternating current output terminals of the inverter 2 and the inverter 4 are connected to another winding of the three-winding transformer.

Figures 1, 3B:
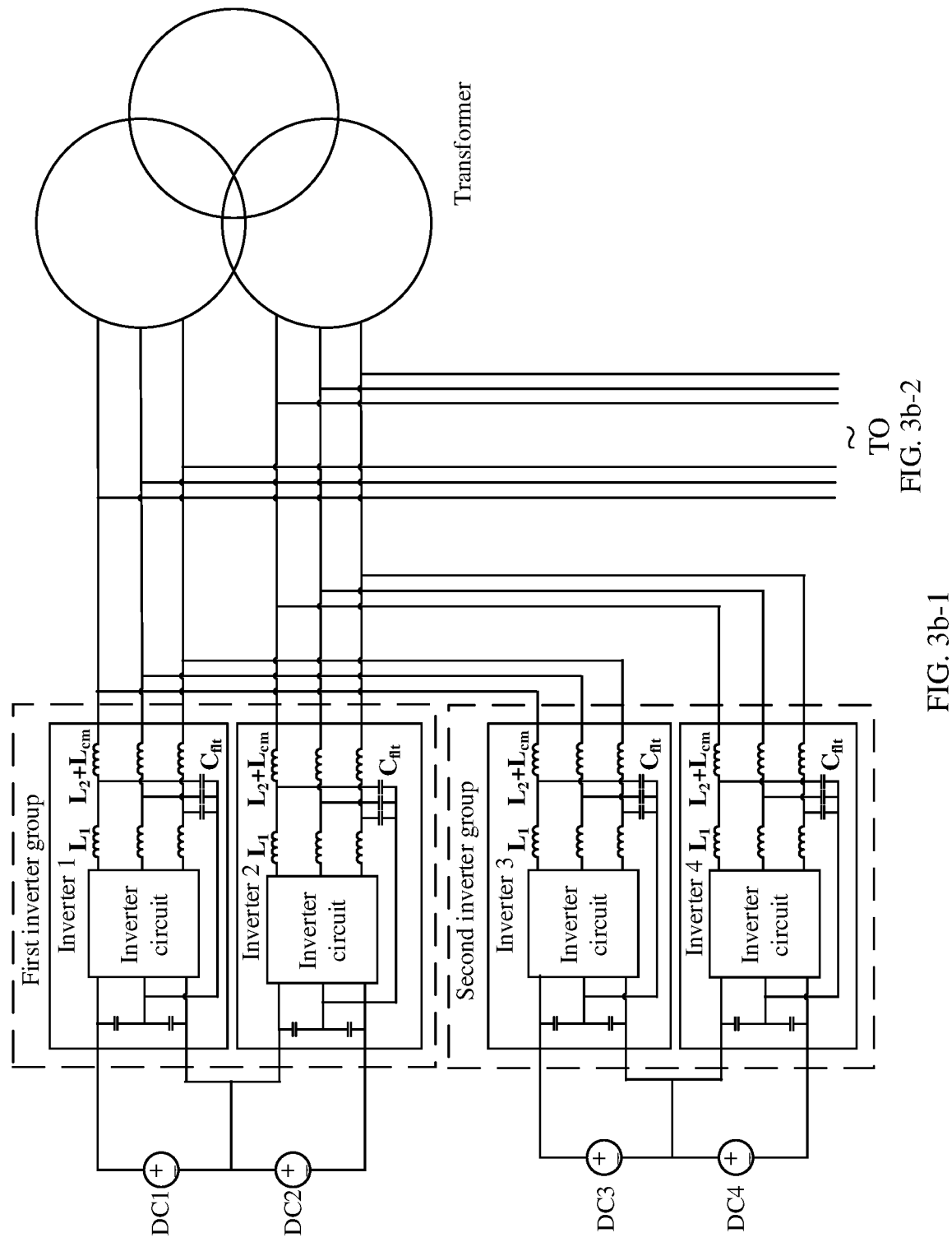
Figures 2, 3B:
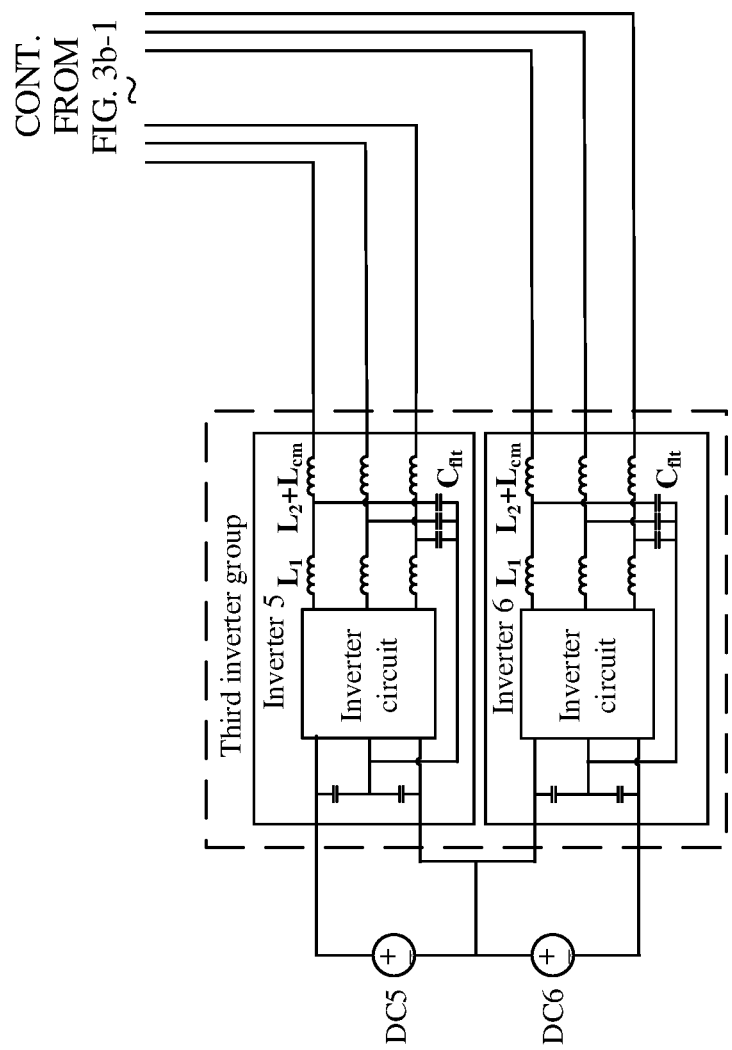

For example, the inverter parallel system includes three inverter groups. As shown in FIG. 3b-1 and FIG. 3b-2, the inverter parallel system includes a first inverter group, a second inverter group, and a third inverter group. The first inverter group includes an inverter 1 and an inverter 2, the second inverter group includes an inverter 3 and an inverter 4, and the third inverter group includes an inverter 5 and an inverter 6. A direct current input terminal of the inverter 1 is connected to a DC 1, and a direct current input terminal of the inverter 2 is connected to a DC 2. A negative electrode of the DC power supply 1 is connected to a positive electrode of the DC 2. A direct current input terminal of the inverter 3 is connected to a DC 3, and a direct current input terminal of the inverter 4 is connected to a DC 4. A negative electrode of the DC 3 is connected to a positive electrode of the DC 4. A direct current input terminal of the inverter 5 is connected to a DC 5, and a direct current input terminal of the inverter 6 is connected to a DC 6. A negative electrode of the DC 5 is connected to a positive electrode of the DC 6. An alternating current output terminal of the inverter 1, an alternating current output terminal of the inverter 3, and an alternating current output terminal of the inverter 5 are connected to each other, and the alternating current output terminals of the inverter 1, the inverter 3, and the inverter 5 are connected to one winding of a three-winding transformer. An alternating current output terminal of the inverter 2, an alternating current output terminal of the inverter 4, and an alternating current output terminal of the inverter 6 are connected to each other, and the alternating current output terminals of the inverter 2, the inverter 4, and the inverter 6 are connected to another winding of the three-winding transformer.

Optionally, the method for suppressing a cross current, provided in this embodiment, may also be applied to another inverter parallel system. The inverter parallel system includes: N inverter groups, where N is an integer greater than or equal to 2, and each inverter group includes a first inverter and a second inverter. A direct current input terminal of the first inverter is connected to a first direct current power supply, and a direct current input terminal of the second inverter is connected to a second direct current power supply. A negative electrode of the first direct current power supply is connected to a positive electrode of the second direct current power supply. Alternating current output terminals of N first inverters in the N inverter groups are connected to each other, and the alternating current output terminals of the N first inverters are connected to a first transformer. Alternating current output terminals of N second inverters in the N inverter groups are connected to each other, and the alternating current output terminals of the N second inverters are connected to a second transformer. Negative electrodes of N first direct current power supplies in the N inverter groups are connected to each other. It may be understood that the inverter parallel system differs from the foregoing inverter parallel system in that the negative electrodes of the N first direct current power supplies in the N inverter groups in the foregoing inverter parallel system are connected to each other. That is, neutral wires between different inverter groups are connected to each other.

Figure 4A:
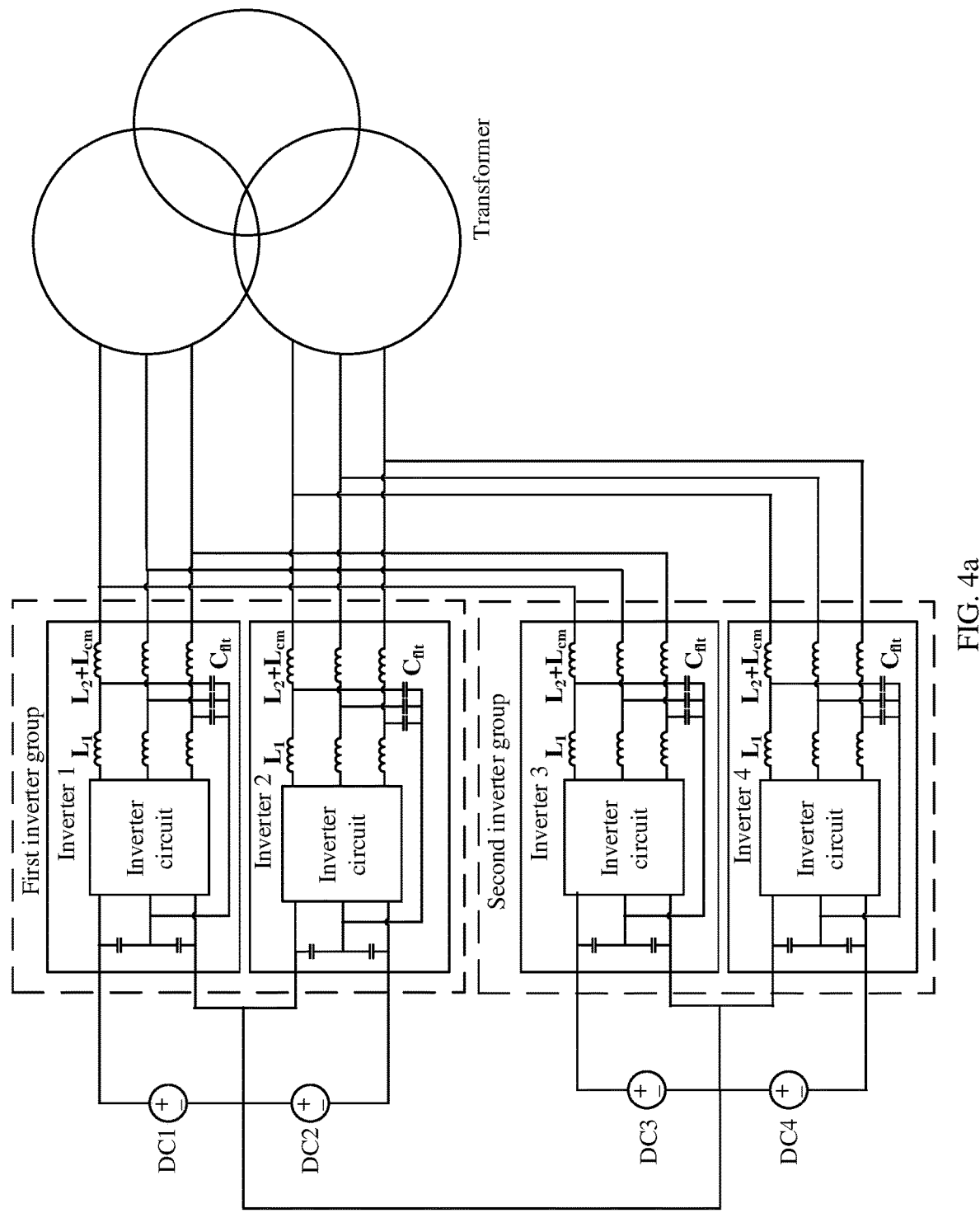
FIG. 4a is a schematic diagram of a structure of another inverter parallel system according to an embodiment.

For example, the inverter parallel system includes two inverter groups. As shown in FIG. 4a, the inverter parallel system includes a first inverter group and a second inverter group. The first inverter group includes an inverter 1 and an inverter 2, and the second inverter group includes an inverter 3 and an inverter 4. A direct current input terminal of the inverter 1 is connected to a DC 1, and a direct current input terminal of the inverter 2 is connected to a DC 2. A negative electrode of the DC 1 is connected to a positive electrode of the DC 2 and a negative electrode of a DC 3. A direct current input terminal of the inverter 3 is connected to the DC 3, and a direct current input terminal of the inverter 4 is connected to a DC 4. The negative electrode of the DC 3 is connected to a positive electrode of the DC 4. An alternating current output terminal of the inverter 1 is connected to an alternating current output terminal of the inverter 3, and the alternating current output terminals of the inverter 1 and the inverter 3 are connected to one winding of a three-winding transformer. An alternating current output terminal of the inverter 2 is connected to an alternating current output terminal of the inverter 4, and the alternating current output terminals of the inverter 2 and the inverter 4 are connected to another winding of the three-winding transformer.

Figures 1, 4B:
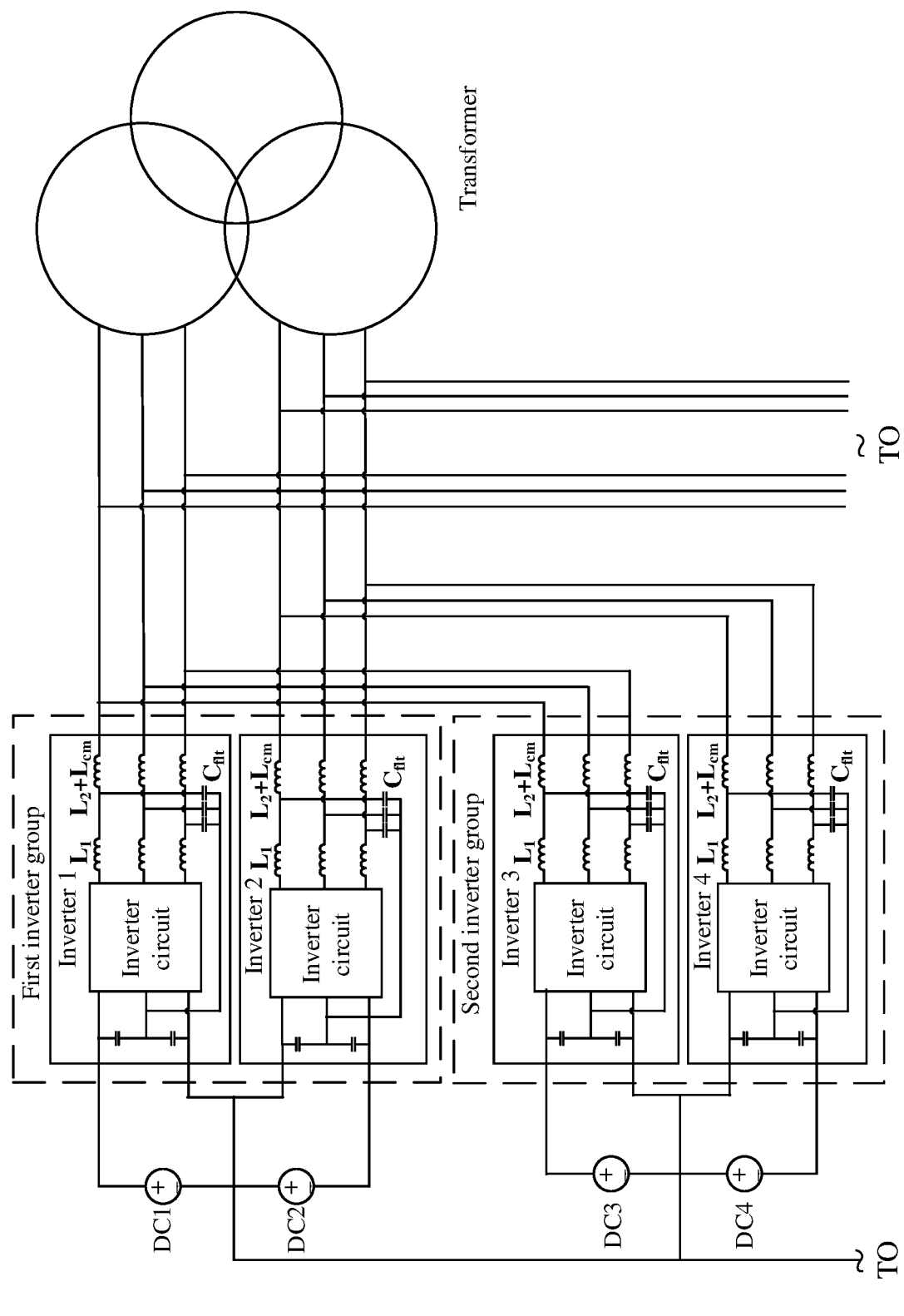
Figures 2, 4B:
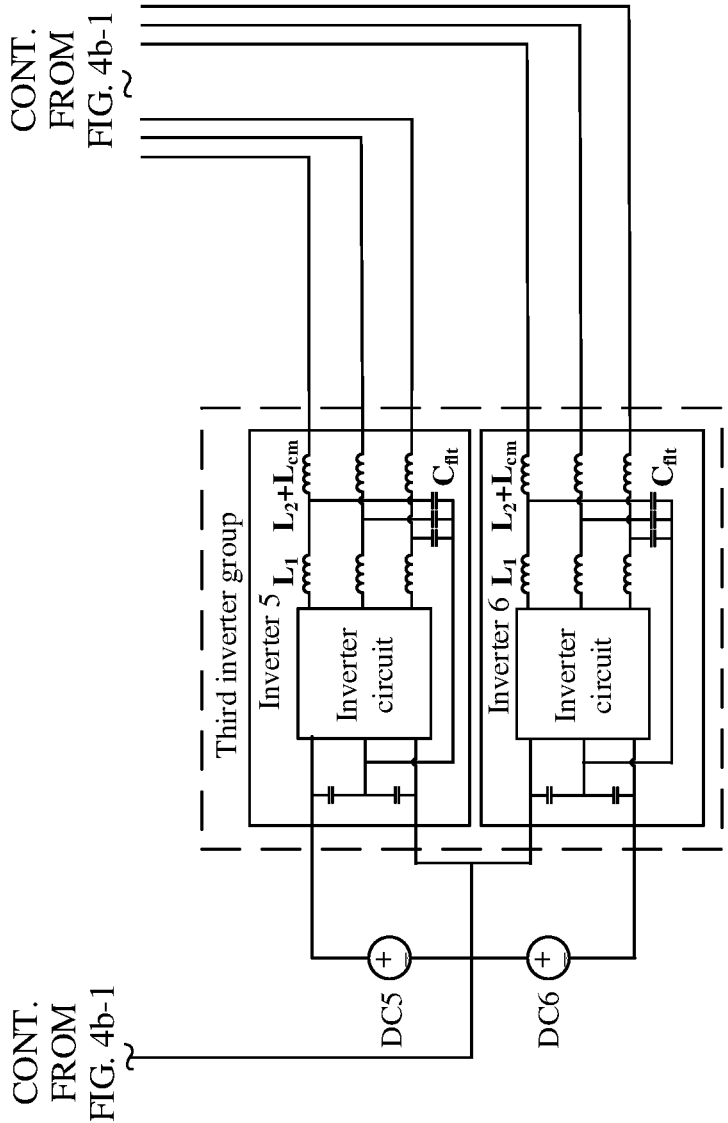

For example, the inverter parallel system includes three inverter groups. As shown in FIG. 4b-1 and FIG. 4b-2, the inverter parallel system includes a first inverter group, a second inverter group, and a third inverter group. The first inverter group includes an inverter 1 and an inverter 2, the second inverter group includes an inverter 3 and an inverter 4, and the third inverter group includes an inverter 5 and an inverter 6. A direct current input terminal of the inverter 1 is connected to a DC 1, and a direct current input terminal of the inverter 2 is connected to a DC 2. A negative electrode of the DC 1 is connected to a positive electrode of the DC 2, a negative electrode of the DC 3, and a negative electrode of a DC 5. A direct current input terminal of the inverter 3 is connected to the DC 3, and a direct current input terminal of the inverter 4 is connected to a DC 4. The negative electrode of the DC 3 is connected to a positive electrode of the DC 4. A direct current input terminal of the inverter 5 is connected to the DC 5, and a direct current input terminal of the inverter 6 is connected to a DC 6. The negative electrode of the DC 5 is connected to a positive electrode of a DC 6. An alternating current output terminal of the inverter 1, an alternating current output terminal of the inverter 3, and an alternating current output terminal of the inverter 5 are connected to each other, and the alternating current output terminals of the inverter 1, the inverter 3, and the inverter 5 are connected to one winding of a three-winding transformer. An alternating current output terminal of the inverter 2, an alternating current output terminal of the inverter 4, and an alternating current output terminal of the inverter 6 are connected to each other, and the alternating current output terminals of the inverter 2, the inverter 4, and the inverter 6 are connected to another winding of the three-winding transformer.

The inverter parallel system shown in FIG. 4a may differ from the inverter parallel system shown in FIG. 3a in that the negative electrode of DC 1 is connected to the negative electrode of DC 3. The inverter parallel system shown in FIG. 4b-1 and FIG. 4b-2 differs from the inverter parallel system in FIG. 3b-1 and FIG. 3b-2 in that the negative electrode of DC 1, the negative electrode of DC 3, and the negative electrode of DC 5 are connected to each other.

The inverter parallel system to which the method for suppressing a cross current, provided in this embodiment, is applied may further include four or more inverter groups. This is not limited. In FIG. 3a, FIG. 3b-1 and FIG. 3b-2, FIG. 4a, and FIG. 4b-1 and FIG. 4b-2, that the inverter parallel system may include either two inverter groups or three inverter groups is only used as an example.

The method for suppressing a cross current, provided in this embodiment, may also be applied to another inverter parallel system. The inverter parallel system includes: N inverters, where N is an integer greater than or equal to 2. Alternating current output terminals of the N inverters are connected to each other, and the alternating current output terminals of the N inverters are connected a transformer. Direct current input terminals of the N inverters are respectively connected to N direct current power supplies, and positive electrodes of the N direct current power supplies are connected to each other, or negative electrodes of the N direct current power supplies are connected to each other.

Figure 5:
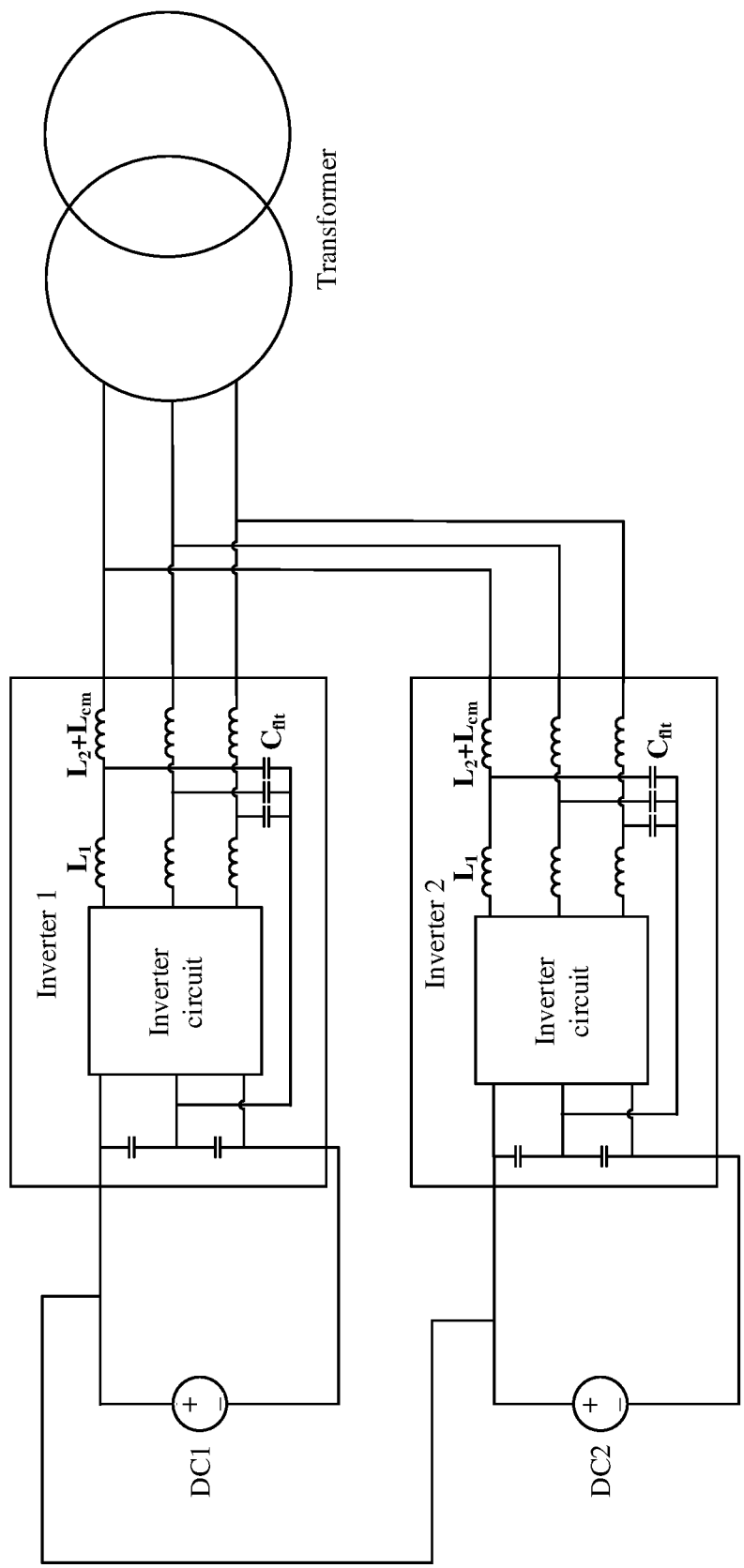
FIG. 5 is a schematic diagram of structure of another inverter parallel system according to an embodiment.

For example, an inverter parallel system is shown in FIG. 5. The inverter parallel system includes two inverters: an inverter 1 and an inverter 2. An alternating current output terminal of the inverter 1 is connected to an alternating current output terminal of the inverter 2, and the alternating current output terminals of the inverter 1 and the inverter 2 are connected to a transformer. A direct current input terminal of the inverter 1 is connected to a DC 1, and a direct current input terminal of the inverter 2 is connected to a DC 2. A positive electrode of the DC 1 is connected to a positive electrode of the DC 2. Optionally, the inverter parallel system may be referred to as a common direct current positive electrode alternating current parallel system.

Figure 6:
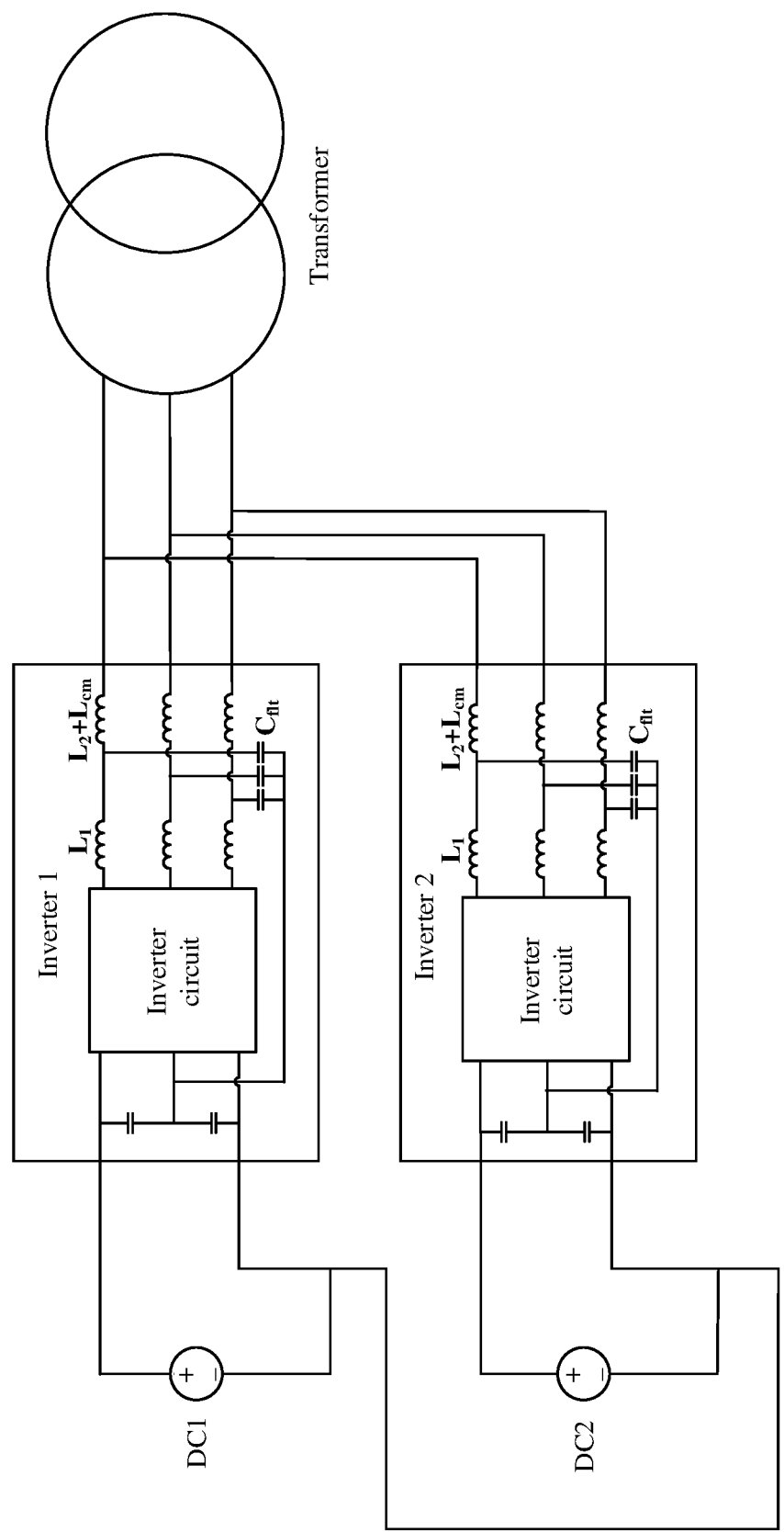
FIG. 6 is a schematic diagram of structure of another inverter parallel system according to an embodiment.

For example, an inverter parallel system is shown in FIG. 6. The inverter parallel system includes two inverters: an inverter 1 and an inverter 2. An alternating current output terminal of the inverter 1 is connected to an alternating current output terminal of the inverter 2, and the alternating current output terminals of the inverter 1 and the inverter 2 are connected to a transformer. A direct current input terminal of the inverter 1 is connected to a DC 1, and a direct current input terminal of the inverter 2 is connected to the DC 2. A negative electrode of the DC 1 is connected to a negative electrode of the DC 2. Optionally, the inverter parallel system may be referred to as a common direct current negative electrode alternating current parallel system.

It may be understood that in FIG. 5 and FIG. 6, that the inverter parallel system includes two inverters is only used as an example. In practical application, the inverter parallel system may include three or more inverters, and a quantity of inverters included in the inverter parallel system is not limited in this embodiment.

It should be noted that, in this embodiment, a type or structure of each inverter in the inverter parallel system is not limited. The structures of the inverters in the inverter parallel system shown in FIG. 1 to FIG. 6 are only examples, and the inverter circuits in the inverters shown in FIG. 1 to FIG. 6 each may include one or more switching elements. By controlling on and off of the switching elements in the inverter circuits, a direct current input to the inverters may be converted into an alternating current.

Figure 7:
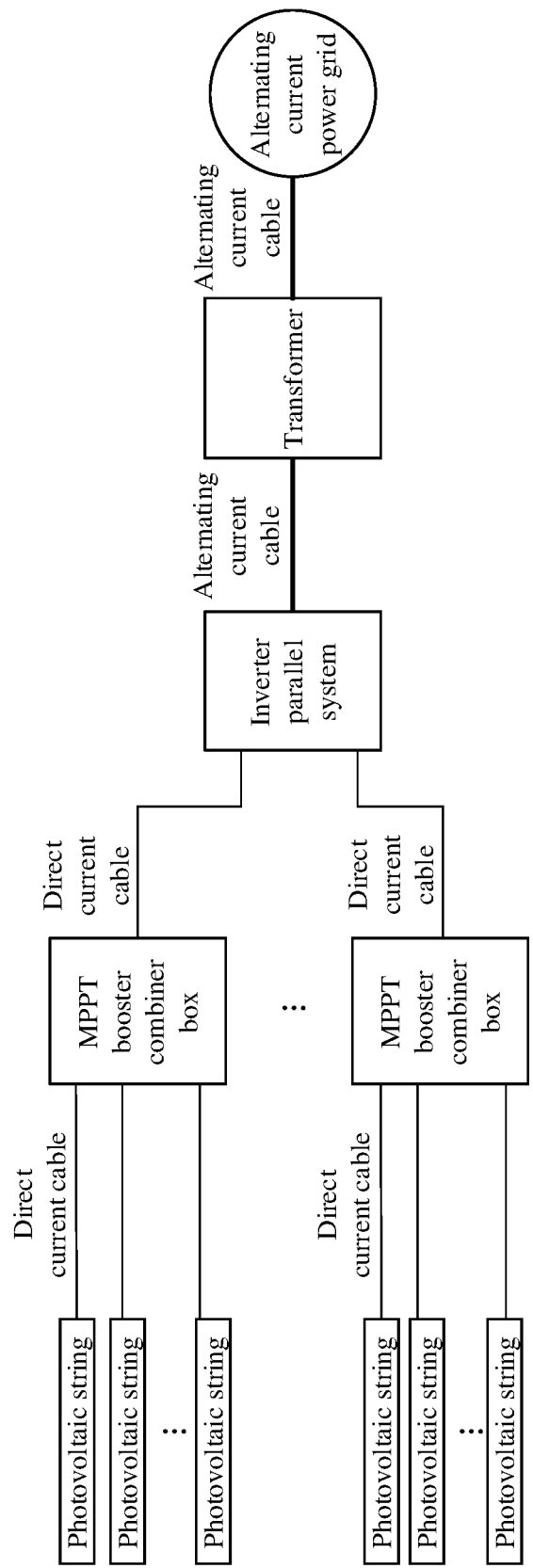
FIG. 7 is a schematic diagram of a structure of a large photovoltaic power station collection system according to an embodiment.

Optionally, the inverter parallel systems shown in FIG. 3a to FIG. 6 may be an inverter parallel system in a large photovoltaic power station collection system shown in FIG. 7.

As shown in FIG. 7, a photovoltaic string in the large photovoltaic power station collection system may include a plurality of photovoltaic panels connected in series and in parallel. The photovoltaic string is configured to convert solar energy into electric energy. The electric energy generated by the photovoltaic string is input into a maximum power point tracking (MPPT) booster combiner box through a direct current cable for boosting, and the boosted direct current is converted into an alternating current by the inverter parallel system. The alternating current is transmitted to a transformer through an alternating current cable. After the transformer adjusts the voltage, the alternating current is fed to an alternating current power grid through the alternating current cable, to implement a power generation function.

Optionally, a method for suppressing a cross current, provided in the following embodiment, may be performed by an apparatus for suppressing a cross current. The apparatus for suppressing a cross current may include a processor and a controller.

Figure 8:
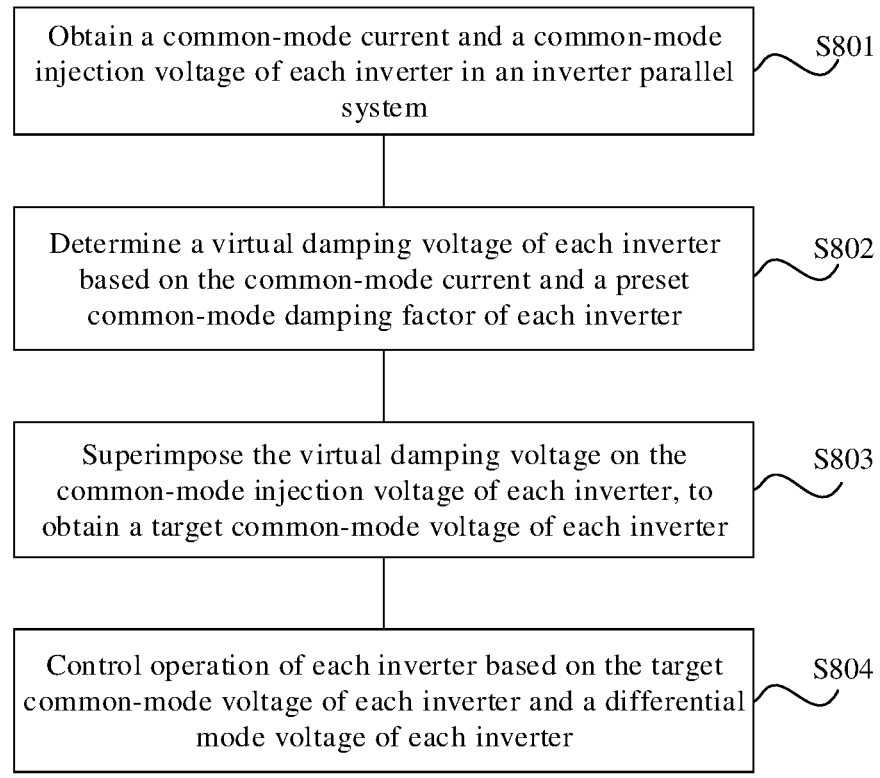
FIG. 8 is a schematic flowchart of a method for suppressing a cross current according to an embodiment.

An embodiment may provide a method for suppressing a cross current. As shown in FIG. 8, the method includes the following steps:

S801: Obtain a common-mode current and a common-mode injection voltage of each inverter in an inverter parallel system.

Optionally, the step S801 may be performed by the processor in the apparatus for suppressing a cross current.

Optionally, the inverter parallel system in the step S801 may be any one of the foregoing inverter parallel systems. For example, the inverter parallel system in the step S801 may be the inverter parallel system shown in any one of FIG. 3a, FIG. 3b-1 and FIG. 3b-2, FIG. 4a, FIG. 4b-1 and FIG. 4b-2, FIG. 5, or FIG. 6.

For example, the obtaining a common-mode current of each inverter in the step S801 may include: obtaining a three-phase output current of each inverter and determining the common-mode current of each inverter based on the three-phase output current of each inverter. Optionally, the three-phase output current of each inverter may be detected by a sensor element. For example, the processor may receive a three-phase output current, of an inverter, detected by a Hall effect sensor. Optionally, the sensor element may detect the three-phase output current of each inverter in real time.

Optionally, the common-mode current of each inverter may be obtained through the following formula:

$i_{cmv}=(i_a+i_b+i_c)/3$, where $i_a$, $i_b$, and $i_c$ each are a three-phase output current of each inverter, and $i_{cmv}$ is the common-mode current of each inverter.

It should be noted that, a direction of the common-mode current of each inverter may change during operation of the inverter parallel system. For example, a direction of a common-mode current of an inverter 1 at a time point T1 may be a direction in which the common-mode current flows out of the inverter, and a direction of the common-mode current of the inverter 1 at a time point T2 may be a direction in which the common-mode current flows into the inverter.

Optionally, if a direction in which a current flows out of the inverter is specified as a positive direction in advance, the common-mode current of the inverter 1 at the time point T1 is a positive value, and the common-mode current of the inverter 1 at the time point T2 is a negative value. If a direction in which a current flows into the inverter is specified as a positive direction in advance, the common-mode current of the inverter 1 at the time point T1 is a negative value, and the common-mode current of the inverter 1 at the time point T2 is a positive value.

Figure 9A:
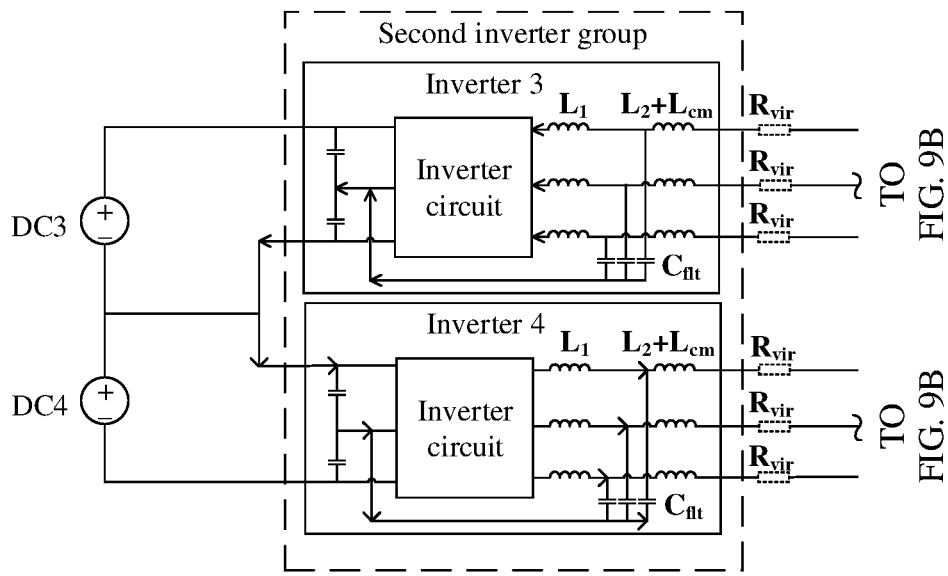
FIG. 9A, FIG. 9B, and FIG. 9C are a schematic diagram of a method for suppressing a cross current according to an embodiment.
Figure 9B:
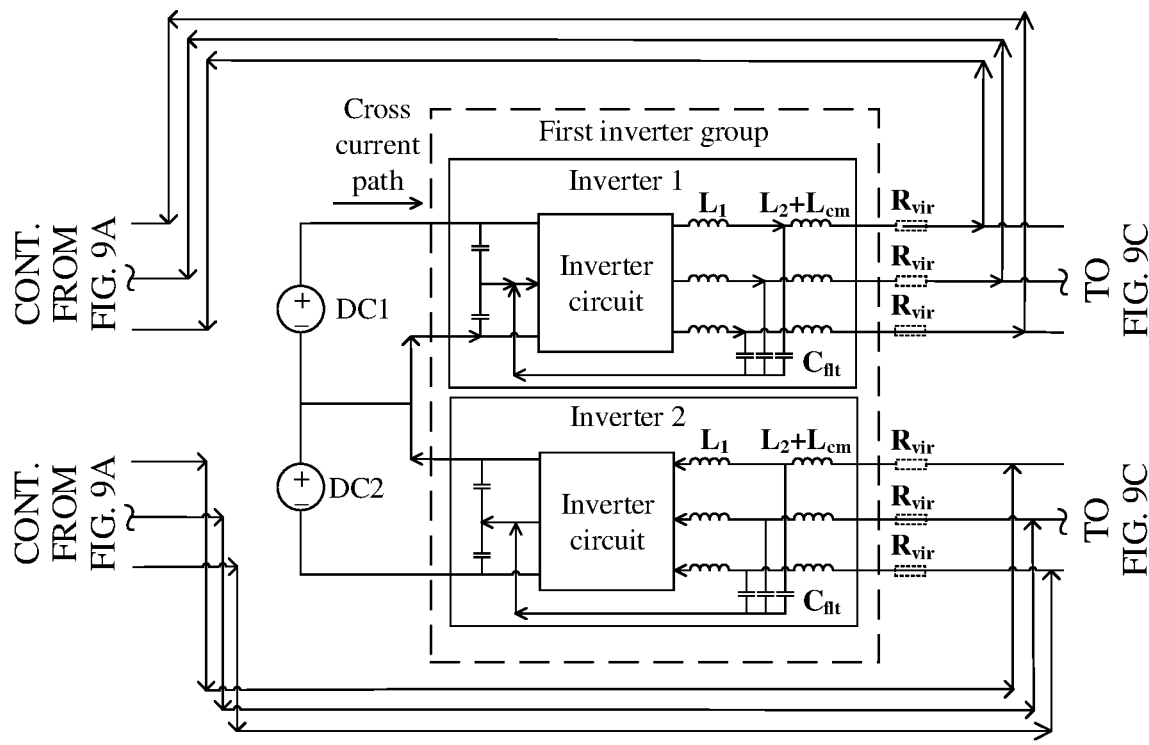
Figure 9C:
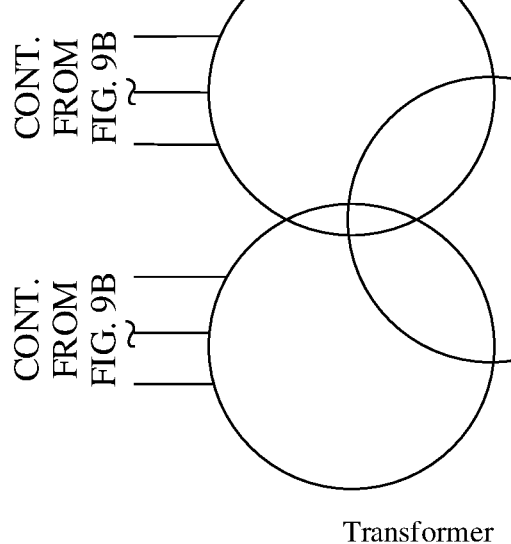

For example, as shown in FIG. 9A, FIG. 9B, and FIG. 9C, a cross current path indicated by arrows in FIG. 9A, FIG. 9B, and FIG. 9C is used as an example. If a direction in which a current flows out of the inverter is specified as a positive direction of the current in advance, as shown in FIG. 9A, FIG. 9B, and FIG. 9C, a common-mode current of an inverter 1 is a positive value, a common-mode current of an inverter 2 is a negative value, a common-mode current of an inverter 3 is a negative value, and a common-mode current of an inverter 4 is a positive value.

For another example, as shown in FIG. 9A, FIG. 9B, and FIG. 9C, the cross current path indicated by the arrows in FIG. 9A, FIG. 9B, and FIG. 9C is used as an example. If a direction in which a current flows into the inverter is specified as a positive direction of the current in advance, as shown in FIG. 9A, FIG. 9B, and FIG. 9C, the common-mode current of the inverter 1 is a negative value, the common-mode current of the inverter 2 is a positive value, the common-mode current of the inverter 3 is a positive value, and the common-mode current of the inverter 4 is a negative value.

Optionally, the obtaining a common-mode injection voltage of each inverter in the step S801 may include: determining the common-mode injection voltage of each inverter based on a common-mode voltage injection mode of each inverter. The common-mode injection voltage may be represented by $U_{cmv0}$.

For example, the common-mode voltage injection mode includes sine pulse width modulation (SPWM), space vector pulse width modulation (SVPWM), or discontinuity pulse width modulation (DPWM). It may be understood that a method for determining the common-mode injection voltage of each inverter may refer to the conventional technology based on the common-mode voltage injection mode of each inverter, and details are not described herein. For example, the common-mode injection $U_{cmv0}$ of each inverter may be calculated based on differential mode voltages $u_a$, $u_b$, and $u_c$, of the inverter and the common-mode injection mode of the inverter.

Optionally, common-mode voltage injection modes of all inverters in the inverter parallel system in this embodiment may be the same.

S802: Determine a virtual damping voltage of each inverter based on the common-mode current of each inverter and a preset common-mode damping factor.

Optionally, the step S802 may be performed by the processor in the apparatus for suppressing a cross current.

If a direction in which a current flows out of the inverter is specified as a positive direction in advance, the preset common-mode damping factor is a negative value. If a direction in which a current flows into the inverter is specified as a positive direction in advance, the preset common-mode damping factor is a positive value.

For example, in the inverter parallel system shown in FIG. 9A, FIG. 9B, and FIG. 9C, the cross current path indicated by the arrows in FIG. 9A, FIG. 9B, and FIG. 9C is used as an example. The method for suppressing a cross current, provided in this embodiment, may increase virtual damping on each inverter, and the preset common-mode damping factor corresponding to the virtual damping is $R_{vir}$. As shown in FIG. 9A, FIG. 9B, and FIG. 9C, if a direction in which a current flows out of the inverter is specified as a positive direction of the current in advance, the preset common-mode damping factors $R_{vir}$ in FIG. 9A, FIG. 9B, and FIG. 9C are all negative values. If a direction in which a current flows into the inverter is specified is a positive direction of the current in advance, the preset common-mode damping factors $R_{vir}$ in FIG. 9A, FIG. 9B, and FIG. 9C are all positive values. It may be understood that, as shown in FIG. 9A, FIG. 9B, and FIG. 9C, in this embodiment, virtual damping may be added to each inverter in the inverter parallel system, and a resistance value corresponding to the virtual damping may be a preset common-mode damping factor.

Optionally, the preset common-mode damping factors corresponding to the virtual damping added to all the inverters in the inverter parallel system are the same. If a direction in which a current flows out of the inverter is specified as a positive direction of the current in advance, the preset common-mode damping factors corresponding to the virtual damping added to all the inverters in the inverter parallel system are all negative values. If a direction in which a current flows into the inverter is specified as a positive direction of the current in advance, the preset common-mode damping factors corresponding to the virtual damping added to all inverters in the inverter parallel system are all positive values.

For example, if a direction in which a current flows out of the inverter is a positive direction, the preset common-mode damping factor is −1.5 ohms. If a direction in which a current flows into the inverter is a positive direction, the preset common-mode damping factor is 1.5 ohms. A value of the preset common-mode damping factor is not limited in this embodiment, and that the value of the preset common-mode damping factor is −1.5 ohms or 1.5 ohms is only used as an example herein. It should be noted that, a larger value of the preset common-mode damping factor indicates a better effect of suppressing a cross current. However, a larger value of the preset common-mode damping factor may cause over-modulation, resulting in that harmonic waves become worse and may not meet a requirement of a power grid. Therefore, the value of the preset common-mode damping factor in practical application needs to consider the effect of suppressing a cross current and consider avoiding over-modulation.

For example, as shown in FIG. 9A, FIG. 9B, and FIG. 9C, if a direction in which a current flows out of the inverter is specified as a positive direction in advance, the preset common-mode damping factors $R_{vir}$ in FIG. 9A, FIG. 9B, and FIG. 9C are all −1.5 ohms. If a direction in which a current flows into the inverter is specified as a positive direction in advance, the preset common-mode damping factors $R_{vir}$ in FIG. 9A, FIG. 9B, and FIG. 9C are all 1.5 ohms.

Optionally, the virtual damping voltage is obtained through the following formula:

$$U_{vir} = i_{cmv} R_{vir}, \text{where}$$

$U_{vir}$ is the virtual damping voltage, $R_{vir}$ is the preset common-mode damping factor, and $i_{cmv}$ is the common-mode current of the inverter.

S803: Superimpose the virtual damping voltage on the common-mode injection voltage of each inverter, to obtain a target common-mode voltage of each inverter.

Optionally, the step S803 may be performed by the processor in the apparatus for suppressing a cross current.

Optionally, the target common-mode voltage of each inverter may be obtained through the following formula:

$$U_{cmv} = U_{cmv0} + U_{vir}, \text{where}$$

$U_{cmv}$ is the target common-mode voltage of each inverter, $U_{cmv}$ is the common-mode injection voltage of each inverter, and $U_{vir}$ is the virtual damping voltage of each inverter.

Figure 10:
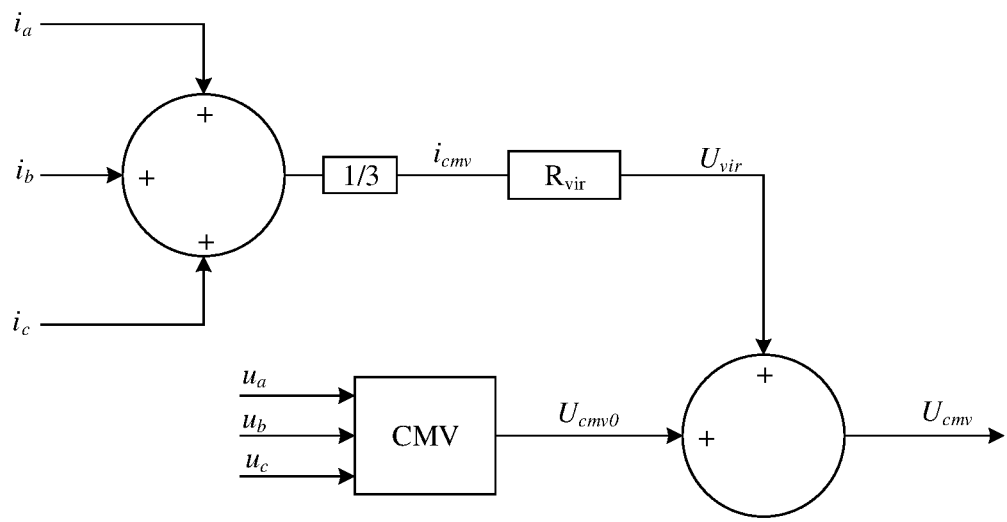
FIG. 10 is a schematic diagram of another method for suppressing a cross current according to an embodiment.

For example, as shown in FIG. 10, the common-mode current $i_{cmv}$ is calculated based on three-phrase currents $i_a$, $i_b$, and $i_c$ of each inverter, and the virtual damping voltage $U_{vir}$ is obtained based on the common-mode current $i_{cmv}$ and the preset common-mode damping factor $R_{vir}$. The target common-mode voltage $U_{cmv}$ is obtained by superimposing the virtual damping voltage $U_{vir}$ on the common-mode injection voltage $U_{cmv0}$.

It may be understood that, for each inverter in the inverter parallel system, the target common-mode voltage is calculated in the same manner. Since when a cross current is generated in the inverter parallel system, directions of common-mode currents of different inverters are different. If a direction in which a current flows out of the inverter is specified as a positive direction in advance, the preset common-mode damping factor may be set to a negative value, or if a direction in which a current flows into the inverter is specified as a positive direction in advance, the preset common-mode damping factor may be set to a positive value, so that after the virtual damping voltage is superimposed on the common-mode injection voltage of each inverter, an effective value of the common-mode voltage difference between the inverters can be reduced. Therefore, a common-mode cross current can be reduced, and the cross current in the inverter parallel system is effectively suppressed.

For example, a cross current path is the cross current path indicated by the arrows in FIG. 9A, FIG. 9B, and FIG. 9C, and a current positive direction specified in advance is a direction in which a current flows out of the inverter. As shown in FIG. 9A, FIG. 9B, and FIG. 9C, for the inverter 1, since the preset common-mode damping factor is a negative value, and a direction of the common-mode current of the inverter 1 is the direction in which the current flows out of the inverter (a value of the common-mode current of the inverter 1 is a positive value), a value of the virtual damping voltage of the inverter 1 is a negative value. The virtual damping voltage is superimposed on the common-mode injection voltage of the inverter 1, to obtain a target common-mode voltage of the inverter 1, and an effective value of the target common-mode voltage of the inverter 1 is reduced compared with an effective value of the common-mode injection voltage of the inverter 1. For the inverter 2, since the preset common-mode damping factor is a negative value, and a direction of the common-mode current of the inverter 2 is the direction in which the current flows into the inverter (a value of the common-mode current of the inverter 2 is a negative value), a value of the virtual damping voltage of the inverter 2 is a positive value. The virtual damping voltage is superimposed on the common-mode injection voltage of the inverter 2, to obtain a target common-mode voltage of the inverter 2, and an effective value of the target common-mode voltage of the inverter 2 is increased compared with an effective value of the common-mode injection voltage of the inverter 2. After the method for suppressing a cross current is used, the effective value of the common-mode voltage of the inverter 1 is reduced, and the effective value of the common-mode voltage of the inverter 2 is increased. Therefore, an effective value of a common-mode voltage difference between the inverter 1 and the inverter 2 after the method for suppressing a cross current is used is reduced compared with an effective value of common-mode voltage difference between the inverter 1 and the inverter 2 before the method for suppressing a cross current is used, so that the cross current in the inverter parallel system can be effectively suppressed.

S804: Control operation of each inverter based on the target common-mode voltage of each inverter and a differential mode voltage of each inverter.

Optionally, the step S804 may be performed by the controller of the apparatus for suppressing a cross current.

For example, the step S804 may include: superimposing the target common-mode voltage of each inverter on the differential mode voltage of each inverter, to obtain a modulation voltage of each inverter. The modulation voltage of each inverter is used as a drive signal of a switching element of each inverter, to control the operation of each inverter. For example, the target common-mode voltage and the differential mode voltage of the inverter may be superimposed. A superimposed modulation voltage is used as the drive signal, to control the operation of the switching element in an inverter circuit in the inverter. A structure of a switching element in each inverter is not shown in the inverter parallel systems shown in FIG. 1 to FIG. 6 and FIG. 9A, FIG. 9B, and FIG. 9C.

It may be understood that, in the method for suppressing a cross current, provided in this embodiment, the effective value of the common-mode voltage difference between the inverters is reduced by superimposing the virtual damping voltage on the common-mode injection voltage of each inverter in the inverter parallel system. Therefore, the cross current in the inverter parallel system can be effectively suppressed.

Figure 11:
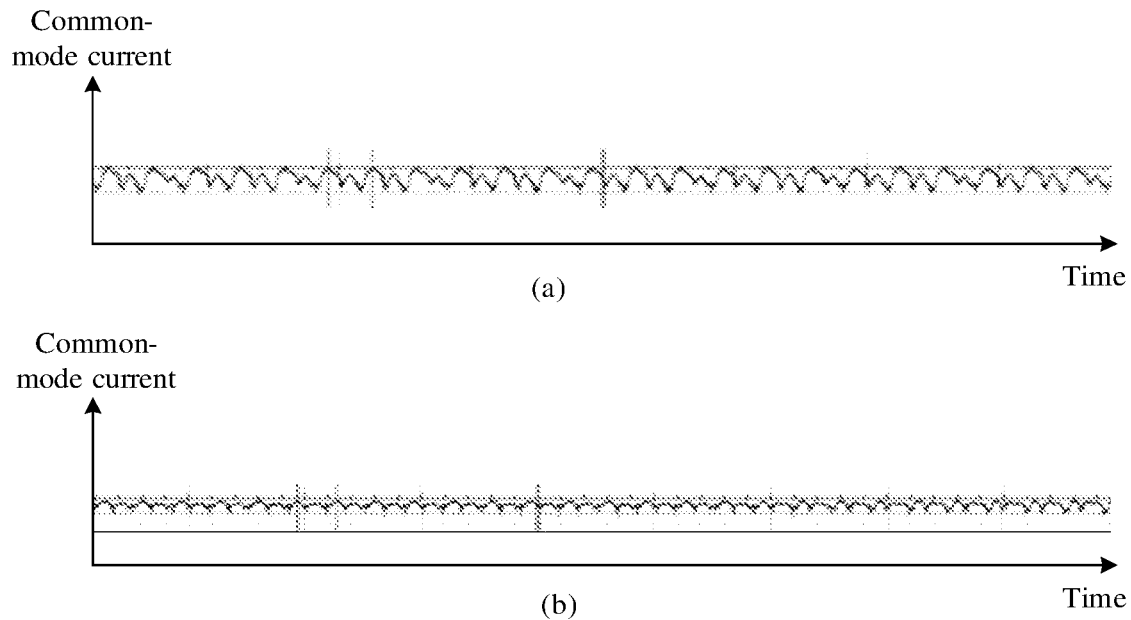
FIG. 11 is a schematic diagram of a comparison between suppression effects of a method for suppressing a cross current according to an embodiment.

For example, FIG. 11 is a diagram of a comparison between effects of suppressing a cross current before and after using the method for suppressing a cross current in this embodiment. As shown in (a) in FIG. 11, before the method for suppressing a cross current provided in this embodiment is used, the effective value of the cross current in the inverter parallel system is larger. As shown in (b) in FIG. 11, after the method for suppressing a cross current provided in this embodiment is used, the effective value of the cross current in the inverter parallel system is smaller. Obviously, the effective value of the cross current in the inverter parallel system after the method for suppressing a cross current provided in this embodiment is used is significantly less than the effective value before the method in this embodiment is used. Therefore, the method for suppressing a cross current can effectively suppress the cross current in the inverter parallel system. In addition, compared with the conventional technology in which a cross current is suppressed through hardware wiring, in this embodiment, a cross current of an inverter is detected in real time and a virtual damping voltage is superimposed, so that the cross current may be suppressed without a hardware parallel cable. Therefore, cable costs may be saved and economic efficiency is high.

According to the method for suppressing a cross current, provided in this embodiment, the virtual damping voltage is superimposed on the common-mode injection voltage of each inverter in the inverter parallel system, so that the effective value of the common-mode voltage difference between the inverters is reduced. Therefore, the cross current in the inverter parallel system can be effectively suppressed, and reliability of inverter components is improved. In addition, compared with the conventional technology in which a cross current is suppressed through hardware wiring, in the method, the cross current can be suppressed without a hardware parallel cable. Therefore, the cable costs may be saved and the economic efficiency is high.

The above describes the solution provided in this embodiment from the perspective of the method and steps. It may be understood that, to implement the foregoing functions, a computer includes a corresponding hardware structure and/or a corresponding software module for executing each function. A person skilled in the art may easily be aware of that, with reference to the modules and algorithm steps in the examples described in the embodiments may be implemented in the form of a combination of hardware and computer software. A person skilled in the art may implement the described functions using different methods for each particular application, but such implementation should not be considered beyond the scope of the embodiments.

In this embodiment, division of function modules of the computer may be performed according to the foregoing method example, for example, each function module may be divided corresponding to each function, or two or more functions may be integrated into one processing module. The integrated module may be implemented in the form of hardware or implemented in the form of a soft function module. It should be noted that the division of the modules in this embodiment is schematic and is only division of logical functions. There may be another manner of division in actual implementation.

Figure 12:
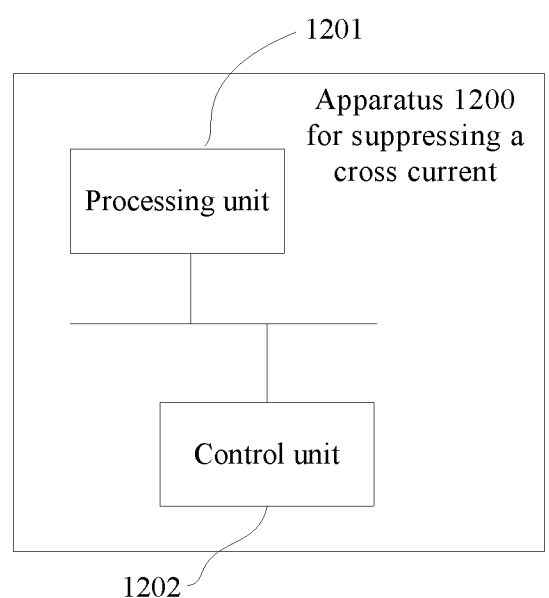
FIG. 12 is a schematic diagram of composition of an apparatus for suppressing a cross current according to an embodiment.

FIG. 12 shows a schematic diagram of a possible structure of the apparatus for suppressing a cross current in the embodiment described above. The apparatus 1200 for suppressing a cross current includes a processing unit 1201 and a control unit 1202. Optionally, if the apparatus 1200 for suppressing a cross current includes a storage unit, the processing unit 1201 may further execute a program or an instruction stored in a memory, to enable the apparatus 1200 for suppressing a cross current to implement the method and the functions in any one of the foregoing embodiments.

For example, the processing unit 1201 may be configured to support the apparatus 1200 for suppressing a cross current to perform S801 to S803 in FIG. 8, and/or is used in another process. The control unit 1202 may be configured to support the apparatus 1200 for suppressing a cross current to perform S804 in FIG. 8, and/or is used in another process. All relevant contents of the steps in the foregoing method embodiment may be referred to function description of a corresponding function module, and details are not described herein.

Optionally, the 1200 apparatus for suppressing a cross current may further include a transceiver unit. The processing unit 1201 may obtain an output current of each inverter in an inverter parallel system in real time through the transceiver unit. Optionally, a function of the transceiver unit may be executed by a transceiver or a communications interface.

For example, in a hardware implementation, functions of the processing unit 1201 may be executed by one or more processors, and functions of the control unit 1202 may be executed by a controller. The processing unit 1201 may be embedded in or independent of the processor of the apparatus 1200 for suppressing a cross current in the form of hardware or may be stored in the memory of the 1200 apparatus for suppressing a cross current in the form of software, so that the processor invokes and performs operations corresponding to the functional units. Optionally, the processor that executes the functions of the processing unit 1201 and the controller that executes the functions of the control unit 1202 may be integrated into one chip.

An embodiment may further provide a power supply system. The power supply system includes an apparatus for suppressing a cross current, and the inverter parallel system shown in any one of FIG. 3a, FIG. 3b-1 and FIG. 3b-2, FIG. 4a, FIG. 4b-1 and FIG. 4b-2, FIG. 5, or FIG. 6. The apparatus for suppressing a cross current is configured to use the method for suppressing a cross current shown in FIG. 8 to suppress a cross current in the inverter parallel system.

An embodiment may further provide an apparatus. The apparatus exists in a product form of at least one chip, for example, a chipset. A structure of the apparatus includes a processor and an interface circuit, and the processor may communicate with another apparatus through the interface circuit. Optionally, the apparatus may further include a memory. The memory is coupled to the processor, to store necessary program instructions and data of the apparatus, and the processor is configured to execute the program instructions stored in the memory, so that the apparatus performs the method for suppressing a cross current shown in FIG. 8. Optionally, the memory may be a storage module in the chip, for example, a register or a cache. The storage module may be a storage module located outside the chip, for example, a read-only memory (ROM), another type of static storage device capable of storing static information and instructions, or a random access memory (RAM).

The steps of the method or the algorithm described may be implemented by the hardware or may be implemented by a processor executing software instructions. The software instructions may include corresponding software modules which may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well known in this field. An exemplary storage medium is coupled to the processor to enable the processor to read information from the storage medium and write information into the storage medium. The storage medium may alternatively be a component of the processor. The processor and the storage medium may be located in an ASIC. In addition, the ASIC may be located in an interface device of a core network. The processor and the storage medium may alternatively exist as discrete components in the interface device of the core network.

A person skilled in the art may be aware of that, in the foregoing one or more examples, the functions may be implemented by using hardware, software, firmware, or any combination thereof. When the functions are implemented by using software, these functions may be stored in a non-transitory computer-readable medium. The non-transitory computer-readable medium includes a computer storage medium. The storage medium may be any available medium that can be accessed by a general-purpose or a special-purpose computer.

The objectives and beneficial effects are further described in detail in the foregoing embodiments. It should be understood that, the foregoing descriptions are only embodiments, and are not intended as limiting, and any modification, equivalent replacement or improvement shall fall within the scope of the embodiments.

What is claimed is:

1. A method for suppressing a cross current in an inverter parallel system, the method comprising:
   obtaining a common-mode current and a common-mode injection voltage of each inverter in the inverter parallel system;
   determining a virtual damping voltage of the each inverter based on the common-mode current and a preset common-mode damping factor of the each inverter, wherein if a direction in which a current flows out of the inverter is a positive direction, the preset common-mode damping factor is a negative value, or if a direction in which a current flows into the inverter is a positive direction, the preset common-mode damping factor is a positive value;
   superimposing the virtual damping voltage on the common-mode injection voltage of the each inverter, to obtain a target common-mode voltage of the each inverter; and
   controlling operation of the each inverter based on the target common-mode voltage of the each inverter and a differential mode voltage of the each inverter.

2. The method for suppressing a cross current in an inverter parallel system according to claim 1, wherein the inverter parallel system comprises:
   N inverter groups, wherein N is an integer greater than or equal to 2, the each inverter group comprises a first inverter and a second inverter, a direct current input terminal of the first inverter is connected to a first direct current power supply, a direct current input terminal of the second inverter is connected to a second direct current power supply, and
   a negative electrode of the first direct current power supply is connected to a positive electrode of the second direct current power supply; and alternating current output terminals of N first inverters in the N inverter groups are connected to a first transformer, and alternating current output terminals of N second inverters in the N inverter groups are connected to a second transformer.

3. The method for suppressing a cross current in an inverter parallel system according to claim 2, wherein negative electrodes of N first direct current power supplies in the N inverter groups are connected to each other.

4. The method for suppressing a cross current in an inverter parallel system according to claim 1, wherein the inverter parallel system comprises:
   N inverters, wherein N is an integer greater than or equal to 2, alternating current output terminals of the N inverters are connected to each other, and the alternating current output terminals of the N inverters are connected to a transformer; and direct current input terminals of the N inverters are respectively connected to N direct current power supplies, and positive electrodes of the N direct current power supplies are connected to each other.

5. The method for suppressing a cross current in an inverter parallel system according to claim 1, wherein the inverter parallel system comprises:
   N inverters, wherein N is an integer greater than or equal to 2, alternating current output terminals of the N inverters are connected to each other, and the alternating current output terminals of the N inverters are connected to a transformer; and direct current input terminals of the N inverters are respectively connected to N direct current power supplies, and negative electrodes of the N direct current power supplies are connected to each other.

6. The method for suppressing a cross current in an inverter parallel system according to claim 1, wherein obtaining the common-mode injection voltage of the each inverter further comprises:
   determining the common-mode injection voltage of the each inverter based on a common-mode voltage injection mode of the each inverter.

7. The method for suppressing a cross current in an inverter parallel system according to claim 6, wherein the common-mode voltage injection mode comprises SPWM, SVPWM, or DPWM.

8. The method for suppressing a cross current in an inverter parallel system according to claim 1, wherein the target common-mode voltage is obtained through the following formulas:

$$U_{cmv} = U_{cmv0} + U_{vir}, \text{ and}$$

$$U_{vir} = i_{cmv} R_{vir}, \text{ wherein}$$

$U_{cmv}$ is the target common-mode voltage, $U_{cmv0}$ is the common-mode injection voltage, $U_{vir}$ is the virtual damping voltage, $R_{vir}$ is the preset common-mode damping factor, and $i_{cmv}$ is the common-mode current.

9. The method for suppressing a cross current in an inverter parallel system according to claim 8, wherein the common-mode current is obtained through the following formula:

$$i_{cmv}=(i_a+i_b+i_c)/3, \text{ wherein}$$

$i_a$, $i_b$, and $i_c$ each are a three-phase output current of the inverter, and $i_{cmv}$ is the common-mode current.

10. The method for suppressing a cross current in an inverter parallel system according to claim 1, wherein the controlling operation of the each inverter based on the target common-mode voltage of the each inverter and the differential mode voltage of the each inverter further comprises:
   superimposing the target common-mode voltage of the each inverter on the differential mode voltage of the each inverter, to obtain a modulation voltage of the each inverter; and
   controlling the operation of the each inverter by using the modulation voltage of the each inverter as a drive signal of a switching element of the each inverter.

11. An apparatus for suppressing a cross current in an inverter parallel system, the apparatus comprising:
   a processor configured to:
   obtain a common-mode current and a common-mode injection voltage of each inverter in the inverter parallel system;
   determine a virtual damping voltage of the each inverter based on the common-mode current and a preset common-mode damping factor of the each inverter, wherein after a direction in which a current flows out of the inverter is a positive direction, the preset common-mode damping factor is a negative value, or after a direction in which a current flows into the inverter is a positive direction, the preset common-mode damping factor is a positive value;
   superimpose the virtual damping voltage on the common-mode injection voltage of the each inverter, to obtain a target common-mode voltage of the each inverter; and
   control, by using a controller, operation of the each inverter based on the target common-mode voltage that is of the each inverter and that is obtained by the processor and a differential mode voltage of the each inverter.

12. The apparatus for suppressing a cross current in an inverter parallel system according to claim 11, wherein the inverter parallel system comprises:
   N inverter groups, wherein N is an integer greater than or equal to 2, the each inverter group comprises a first inverter and a second inverter, a direct current input terminal of the first inverter is connected to a first direct current power supply, a direct current input terminal of the second inverter is connected to a second direct current power supply, and a negative electrode of the first direct current power supply is connected to a positive electrode of the second direct current power supply; and
   alternating current output terminals of N first inverters in the N inverter groups are connected to a first transformer, and alternating current output terminals of N second inverters in the N inverter groups are connected to a second transformer.

13. The apparatus for suppressing a cross current in an inverter parallel system according to claim 12, wherein negative electrodes of N first direct current power supplies in the N inverter groups are connected to each other.

14. The apparatus for suppressing a cross current in an inverter parallel system according to claim 11, wherein the inverter parallel system comprises:
   N inverters, wherein N is an integer greater than or equal to 2, alternating current output terminals of the N inverters are connected to each other, and the alternating current output terminals of the N inverters are connected to a transformer; and direct current input terminals of the N inverters are respectively connected to N direct current power supplies, and positive electrodes of the N direct current power supplies are connected to each other.

15. The apparatus for suppressing a cross current in an inverter parallel system according to claim 11, wherein the inverter parallel system comprises:
   N inverters, wherein N is an integer greater than or equal to 2, alternating current output terminals of the N inverters are connected to each other, and the alternating current output terminals of the N inverters are connected to a transformer; and direct current input terminals of the N inverters are respectively connected to N direct current power supplies, and negative electrodes of the N direct current power supplies are connected to each other.

16. The apparatus for suppressing a cross current in an inverter parallel system according to claim 11, wherein the processor is further configured to:
   determine the common-mode injection voltage of the each inverter based on a common-mode voltage injection mode of the each inverter.

17. The apparatus for suppressing a cross current in an inverter parallel system according to claim 16, wherein the common-mode voltage injection mode comprises sine pulse width modulation (SPWM), space vector pulse width modulation (SVPWM), or discontinuity pulse width modulation (DPWM).

18. The apparatus for suppressing a cross current in an inverter parallel system according to claim 11, wherein the target common-mode voltage is obtained through the following formulas:

$$U_{cmv}=U_{cmv0}+U_{vir}, \text{ and}$$

$$U_{vir}=i_{cmv}R_{vir}, \text{ wherein}$$

$U_{cmv}$ is the target common-mode voltage, $U_{cmv0}$ is the common-mode injection voltage, $U_{vir}$ is the virtual damping voltage, $R_{vir}$ is the preset common-mode damping factor, and $i_{cmv}$ is the common-mode current.

19. The apparatus for suppressing a cross current in an inverter parallel system according to claim 11, wherein the processor is further configured to:
   superimpose the target common-mode voltage of the each inverter on the differential mode voltage of the each inverter, to obtain a modulation voltage of the each inverter; and
   use the modulation voltage that is of the each inverter and that is obtained by the processor as a drive signal of a switching element of the each inverter, to control the operation of the each inverter.

20. A power supply system, comprising an inverter parallel system and the apparatus for suppressing the cross current in the inverter parallel system according to claim 11, and the apparatus for suppressing the current in the inverter parallel system is configured to suppress the cross current in the inverter parallel system.

* * * * *